US008374845B2

(12) United States Patent
Doi et al.

(10) Patent No.: US 8,374,845 B2
(45) Date of Patent: Feb. 12, 2013

(54) RETRIEVING APPARATUS, RETRIEVING METHOD, AND COMPUTER PROGRAM PRODUCT

(75) Inventors: Miwako Doi, Kanagawa (JP); Kaoru Suzuki, Kanagawa (JP); Toshiyuki Koga, Kanagawa (JP); Koichi Yamamoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1081 days.

(21) Appl. No.: 12/040,267

(22) Filed: Feb. 29, 2008

(65) Prior Publication Data

US 2009/0083029 A1 Mar. 26, 2009

(30) Foreign Application Priority Data

Sep. 25, 2007 (JP) ................................. 2007-247995

(51) Int. Cl.
*G06F 17/27* (2006.01)
(52) U.S. Cl. ............ 704/9; 386/291; 386/323; 704/200; 704/243; 704/254; 704/257; 705/500; 715/721; 725/136; 725/40; 725/46; 725/86
(58) Field of Classification Search .................. 704/243, 704/254, 10, 200, 257; 386/291, 323; 715/721; 725/136, 40, 46, 86; 705/500
See application file for complete search history.

(56) References Cited

U.S. PATENT DOCUMENTS

| | | | | |
|---|---|---|---|---|
| 4,985,924 A | * | 1/1991 | Matsuura | 704/254 |
| 5,903,262 A | * | 5/1999 | Ichihashi et al. | 725/136 |
| 6,075,527 A | * | 6/2000 | Ichihashi et al. | 715/721 |
| 7,117,518 B1 | * | 10/2006 | Takahashi et al. | 725/86 |
| 7,577,972 B2 | * | 8/2009 | Kimura et al. | 725/40 |
| 2001/0018654 A1 | * | 8/2001 | Hon et al. | 704/257 |
| 2003/0237093 A1 | * | 12/2003 | Marsh | 725/46 |
| 2004/0181391 A1 | * | 9/2004 | Inoue et al. | 704/10 |
| 2005/0049934 A1 | * | 3/2005 | Nakayama et al. | 705/26 |
| 2005/0159954 A1 | * | 7/2005 | Chu et al. | 704/254 |
| 2006/0106604 A1 | * | 5/2006 | Okimoto | 704/243 |
| 2006/0116869 A1 | * | 6/2006 | Kimura et al. | 704/200 |
| 2006/0265427 A1 | * | 11/2006 | Cohen et al. | 707/200 |
| 2007/0055649 A1 | | 3/2007 | Tsuzuki et al. | |
| 2009/0052863 A1 | * | 2/2009 | Parmar et al. | 386/83 |

(Continued)

FOREIGN PATENT DOCUMENTS

| | | |
|---|---|---|
| JP | 10-149370 | 6/1998 |
| JP | 2004-171174 | 6/2004 |

(Continued)

OTHER PUBLICATIONS

U.S. Appl. No. 12/041,283, filed Mar. 3, 2008, Doi, et al.
Japanese Office Action issued Apr. 24, 2012, in Japan Patent Application No. 2007-247995 (with English translation).

(Continued)

*Primary Examiner* — Michael Colucci
(74) *Attorney, Agent, or Firm* — Oblon, Spivak, McClelland, Maier & Neustadt, L.L.P.

(57) ABSTRACT

A word coinciding with a key word input by speech and a word related to the word are set as retrieval candidate words based on a word dictionary in which words representing formal names and aliases of the formal names are registered in association with a family attribute indicating a familiar relation among the words. Content related to any one of retrieval words selected out of the retrieval candidate words and a word related to the retrieval word is retrieved.

3 Claims, 23 Drawing Sheets

174

| HEADING | READING | FAMILY ATTRIBUTE | CLASSIFICATION ATTRIBUTE | PRESENCE ATTRIBUTE |
|---|---|---|---|---|
| CHIIMU | CHIIMU | NA | TITLE | e178 |
| TIIMU | TIIMU | NA | TITLE | e299 |
| : | : | : | : | : |
| SUGITA KAORU | SUGITAKAORU | NA | PERSON | e3802 |
| : | : | : | : | : |
| MUSUME. | MUSUMEMARU | f1000D | PERSON | NA |
| TKO MUSUME. | TIIKEEOMUSUME | f1000D | PERSON | NA |
| TOKYO NEWS | TOKYO NEWS | NA | TITLE | e116 |
| TOKYO MUSUME. | TOKYOMUSUMEMARU | f1000M | PERSON | c202 |
| T MUSU. | TIIMUSU | f1000D | PERSON | NA |
| : | : | : | : | : |

U.S. PATENT DOCUMENTS

2009/0083227 A1* 3/2009 Doi et al. .................. 707/3
2009/0317055 A1* 12/2009 Iwami .................. 386/83

FOREIGN PATENT DOCUMENTS

| JP | 2005-181442 | 7/2005 |
| JP | 2005-227545 | 8/2005 |
| WO | WO 2005/122016 A1 | 12/2005 |

OTHER PUBLICATIONS

Hiroyuki Sakai, et al., "Casual Information Extraction from Articles Concerning Business Performance of Companies", Proceedings of the Thirteenth Annual Meeting of the Association for Natural Lannguage Processing, Japan, Mar. 19, 2007, pp. 436-439 (with partial English translation).

* cited by examiner

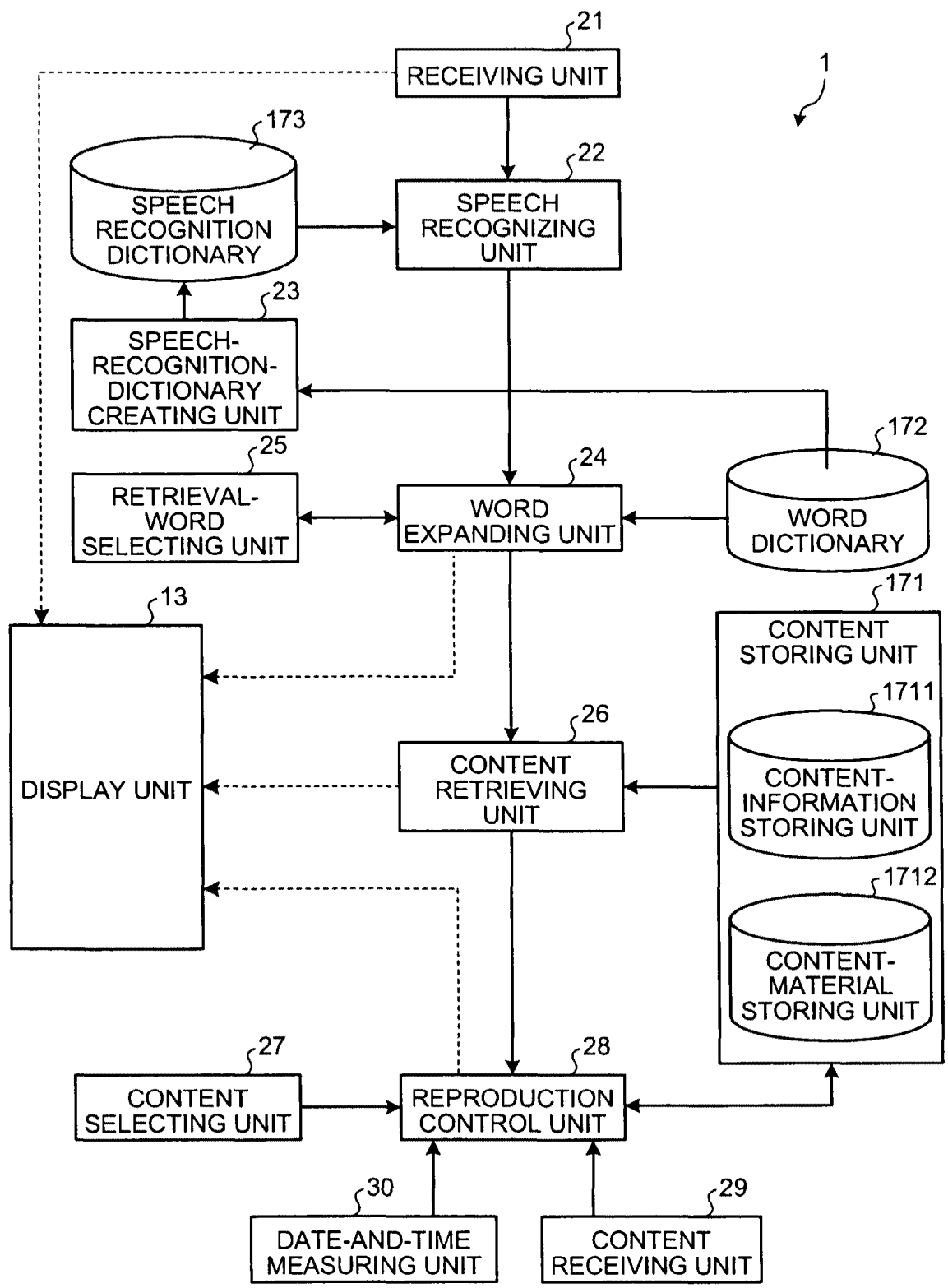

FIG.4

```xml
<?xml version="1.0" encoding="UTF-8" ?>
<epgdata>
<contents cnt="3802">
<dt dy="2005/10/08" />
<ch cd="A044001" />
<program>
<dt>2005/10/08</dt>
<ch>A044001</ch>
<bc>NNN SOGO</bc>
<st>13:00</st>
<et>13:15</et>
<gb>00</gb>
<tn>NEWS</tn>
<cn>[NEWS]▽[WEATHER]▽ACQUISITION OF TTT BROADCAST STOCKS▽SPECIAL
FEATURE/DEVELOPMENT OF HUMAN-TYPE ROBOT</cn>
</program>

<program>
<dt>2005/10/08</dt>
<ch>A044001</ch>
<bc>NNN EDUCATION</bc>
<st>13:15</st>
<et>14:00</et>
<gb>30</gb>
<bm>[MULTI][CHARACTER]</bm>
<tn>LET'S GO Qosm</tn>
<gt>[CREATED]DOI MIWAKO [PERFORMER]SUGITA KAORU [PERFORMER]MATOBA
TSUKASA</gt>
<go>
<nn na="DOI MIWAKO" yo="DOIMIWAKO"/>
<pp na="SUGITA KAORU" yo="SUGITAKAORU"/>
<pp na="MATOBA TSUKASA" yo="MATOBATSUKASA"/>
</go>
<co>LET'S GO Qosm◇MATSUHAMA (SUGITA KAORU) MAKES REQUEST OF HIGASHI
(MATOBA TSUKASA) WHO IS WORRIED ABOUT NEW PRODUCT PLANNING IN
GENERAL ELECTRONIC MANUFACTURER. THE TWO ARE KINDRED SPIRITS AND
DECIDE TO NEGOTIATE WITH PRESIDENT ABOUT NEW PLAN.</co>
</program>

<program>
<dt>2005/10/09</dt>
<ch>A044008</ch>
<bc>PETIT TELEVISION</bc>
<st>20:00</st>
<et>20:54</et>
<gb>40</gb>
<tn>HOI!HOI!HOI!</tn>
<stn>YUKARI IS TAKAHASHI AYA!! MIURA RYOKO, TAKAFUNE JOJI, & YONEDA MIKU
TALK ABOUT THEIR FRIENDSHIP▽ROBO CORO</stn>
<pp>[GUEST]TAKAHASHI AYA [EMCEE]UP DOWN</pp>
</program>

</contents>
</epgdata>
```

FIG.5

| ADDRESS | MEDIA | RECORDING DATE | START | END | TITLE | PERFORMER | THUMBNAIL | BODY | DETAILS |
|---|---|---|---|---|---|---|---|---|---|
| c201 | NNN SOGO | 2005/10/08 | 13:00:00 | 13:15:00 | TOKYO NEWS | NULL | P1 | p101 | ACQUISITION OF TTT BROADCAST STOCKS, SPECIAL FEATURE/ DEVELOPMENT OF HUMAN-TYPE ROBOT |
| c215 | PETIT TELEVISION | 2005/02/08 | 20:00:00 | 20:54:00 | HOII HOII HOII | TOKYO MUSUME. | P2 | p202 | EXIT, ROBO CORO, MIKI NAKAJIMA |
| c233 | MP3 | 2005/12/16 | 12:00 | 19:00 | JAM JAM STREET | NULL | NULL | p203 | PERFORMANCE: MICK ADAMS |
| .. | .. | .. | .. | .. | .. | .. | .. | .. | .. |

FIG.6

| HEADING | READING | FAMILY ATTRIBUTE | CLASSIFICATION ATTRIBUTE |
|---|---|---|---|
| CHIIMU | CHIIMU | NA | TITLE |
| TIIMU | TIIMU | NA | TITLE |
| ⋮ | ⋮ | ⋮ | ⋮ |
| SUGITA KAORU | SUGITAKAORU | NA | PERSON |
| ⋮ | ⋮ | ⋮ | ⋮ |
| MUSUME. | MUSUMEMARU | f1000D | PERSON |
| TKO MUSUME. | TIIKEEOMUSUME | f1000D | PERSON |
| TOKYO NEWS | TOKYO NEWS | NA | TITLE |
| TOKYO MUSUME. | TOKYOMUSUMEMARU | f1000M | PERSON |
| T MUSU. | TIIMUSU | f1000D | PERSON |
| ⋮ | ⋮ | ⋮ | ⋮ |

FIG.7

| DICTIONARY NUMBER | LEXIS | PRONUNCIATION | PART OF SPEECH |
|---|---|---|---|
| ⋮ | ⋮ | ⋮ | ⋮ |
| 121 | CHIIMU | CHIIMU | PROPER NOUN |
| 122 | TIIMU | TIIMU | PROPER NOUN |
| ⋮ | ⋮ | ⋮ | ⋮ |
| 225 | SUGITA KAORU | SUGITAKAORU | PROPER NOUN |
| ⋮ | ⋮ | ⋮ | ⋮ |
| 1315 | MUSUME. | MUSUMEMARU | PROPER NOUN |
| 1316 | TKO MUSUME. | TIIKEEOMUSUME | PROPER NOUN |
| 1317 | TOKYO NEWS | TOKYO NEWS | PROPER NOUN |
| 1318 | TOKYO MUSUME. | TOKYOMUSUMEMARU | PROPER NOUN |
| 1319 | T MUSU. | TIIMUSU | PROPER NOUN |
| ⋮ | ⋮ | ⋮ | ⋮ |

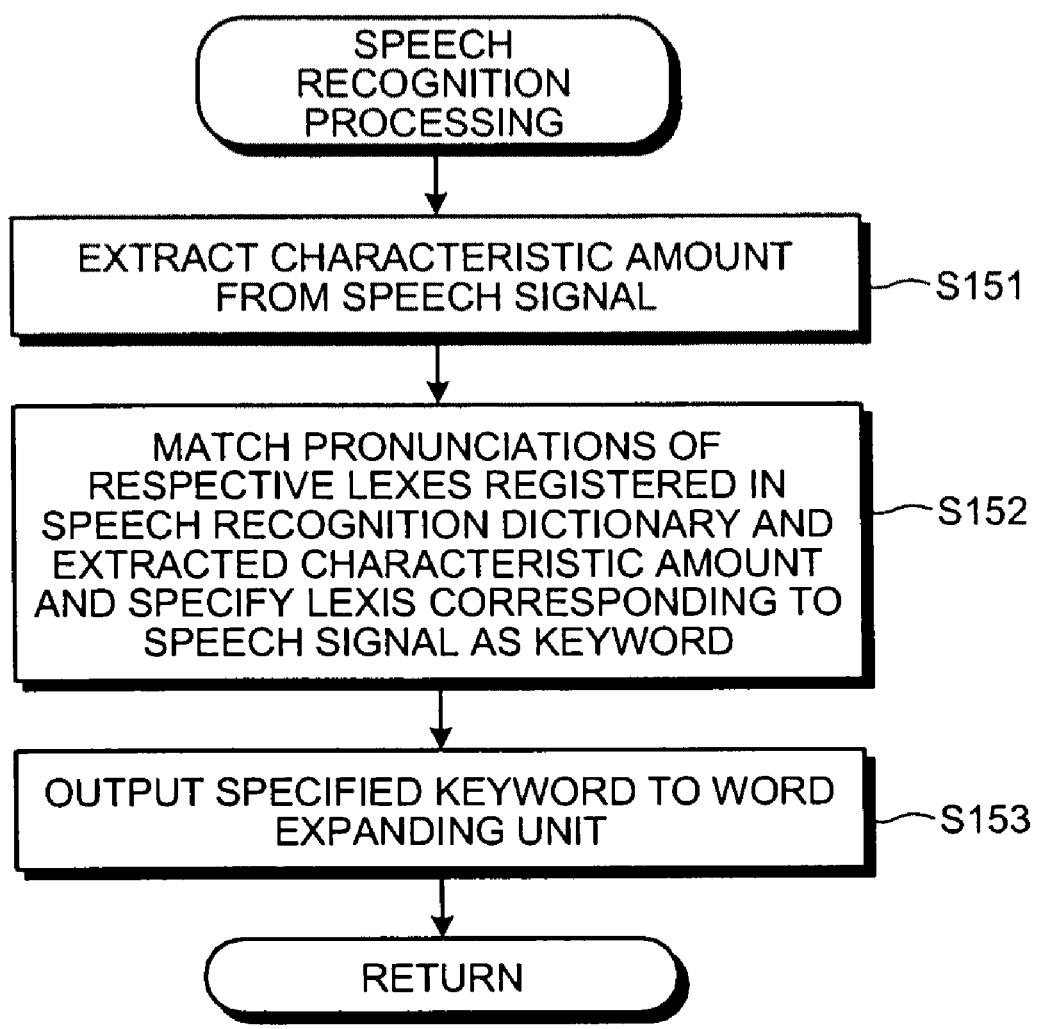

FIG.15

| HEADING | READING | FAMILY ATTRIBUTE | CLASSIFICATION ATTRIBUTE | PRESENCE ATTRIBUTE |
|---|---|---|---|---|
| CHIIMU | CHIIMU | NA | TITLE | e178 |
| TIIMU | TIIMU | NA | TITLE | e299 |
| ⋮ | ⋮ | ⋮ | ⋮ | ⋮ |
| SUGITA KAORU | SUGITAKAORU | NA | PERSON | e3802 |
| ⋮ | ⋮ | ⋮ | ⋮ | ⋮ |
| MUSUME. | MUSUMEMARU | f1000D | PERSON | NA |
| TKO MUSUME. | TIIKEEOMUSUME | f1000D | PERSON | NA |
| TOKYO NEWS | TOKYO NEWS | NA | TITLE | e116 |
| TOKYO MUSUME. | TOKYOMUSUMEMARU | f1000M | PERSON | c202 |
| T MUSU. | TIIMUSU | f1000D | PERSON | NA |
| ⋮ | ⋮ | ⋮ | ⋮ | ⋮ |

FIG.19

| HEADING | READING | FAMILY ATTRIBUTE | CLASSIFICATION ATTRIBUTE | PRESENCE ATTRIBUTE |
|---|---|---|---|---|
| CHIIMU | CHIIMU | NA | TITLE | NA |
| TIIMU | TIIMU | NA | TITLE | NA |
| ⋮ | ⋮ | ⋮ | ⋮ | ⋮ |
| SUGITA KAORU | SUGITAKAORU | NA | PERSON | NA |
| ⋮ | ⋮ | ⋮ | ⋮ | ⋮ |
| MUSUME. | MUSUMEMARU | f1000D | PERSON | NA |
| TKO MUSUME. | TIIKEEOMUSUME | f1000D | PERSON | NA |
| TOKYO NEWS | TOKYO NEWS | NA | TITLE | NA |
| TOKYO MUSUME. | TOKYOMUSUMEMARU | f1000M | PERSON | NA |
| T MUSU. | TIIMUSU | f1000D | PERSON | NA |
| ⋮ | ⋮ | ⋮ | ⋮ | ⋮ |

FIG.20

| HEADING | READING | FAMILY ATTRIBUTE | CLASSIFICATION ATTRIBUTE | PRESENCE ATTRIBUTE |
|---|---|---|---|---|
| CHIIMU | CHIIMU | NA | TITLE | e178 |
| TIIMU | TIIMU | NA | TITLE | e299 |
| ⋮ | ⋮ | ⋮ | ⋮ | ⋮ |
| SUGITA KAORU | SUGITAKAORU | NA | PERSON | e3802 |
| ⋮ | ⋮ | ⋮ | ⋮ | ⋮ |
| TOKYO NEWS | TOKYO NEWS | NA | TITLE | e116 |
| TOKYO MUSUME. | TOKYOMUSUMEMARU | NA | PERSON | c202 |
| ⋮ | ⋮ | ⋮ | ⋮ | ⋮ |

FIG.21

| HEADING | READING | FAMILY ATTRIBUTE | CLASSIFICATION ATTRIBUTE | PRESENCE ATTRIBUTE |
|---|---|---|---|---|
| CHIIMU | CHIIMU | NA | TITLE | e178 |
| TIIMU | TIIMU | NA | TITLE | e299 |
| ⋮ | ⋮ | ⋮ | ⋮ | ⋮ |
| SUGITA KAORU | SUGITAKAORU | NA | PERSON | e3802 |
| ⋮ | ⋮ | ⋮ | ⋮ | ⋮ |
| MUSUME. | MUSUMEMARU | f1000D | PERSON | NA |
| TKO MUSUME. | TIIKEEOMUSUME | f1000D | PERSON | NA |
| TOKYO NEWS | TOKYO NEWS | NA | TITLE | e116 |
| TOKYO MUSUME. | TOKYOMUSUMEMARU | f1000M | PERSON | c202 |
| T MUSU. | TIIMUSU | f1000D | PERSON | NA |
| ⋮ | ⋮ | ⋮ | ⋮ | ⋮ |

FIG.23

| CLASSIFICATION ATTRIBUTE | FIRST RETRIEVAL | SECOND RETRIEVAL | THIRD RETRIEVAL |
|---|---|---|---|
| PERSON | http://www.????1.com/ | http://www.????2.com/ | http://www.????3.com/ |
| TITLE | http://www.????2.com/ | http://www.????1.com/ | http://www.????4.com/ |
| OTHERS | http://www.????4.com/ | http://www.????15.com/ | http://www.????6.com/ |

TOKYO MUSUME. TOKYOMUSUME
AS POPULAR NAMES, "T MUSU. (TIIMUSU)", "TKO MUSUME.",
"MUSUME." ARE WIDELY USED

FIG.24B

TOKYO MUSUME. (TOKYOMUSUME) IS FEMALE IDOL GROUP
AND SINGER GROUP REPRESENTING JAPAN.
WORDS AND MUSIC OF MOST OF SONGS OF TOKYO
MUSUME. ARE WRITTEN AND SONGS ARE PRODUCED BY
DONTSUKU★. ABBREVIATED NAME OF TOKYO MUSUME.
IS T MUSU (TIIMUSU). TOKYO MUSUME. BELONGS TO LARGE
ENTERTAINMENT OFFICE. FRONT LINE.

FIG.24C

DNA DIIENUEE

FIG.25

```
<FAMILY WORD ROW>::=<FAMILY INDICATION><PARTICLE>{FAMILY
    WORD}<PUNCTUATION MARK>|<FAMILY INDICATION
    ><PARTICLE>{<FAMILY WORD><PUNCTUATION MARK>}|<FAMILY
    INDICATION><PARTICLE>{FAMILY WORD}<
    PARTICLE><CHARACTER STRING><PUNCTUATION MARK>|<FAMILY
    INDICATION><PARTICLE>{<FAMILY WORD><PUNCTUATION MARK
    >}<PARTICLE><CHARACTER STRING><PUNCTUATION MARK>|<FAMILY
    INDICATION><PARTICLE><CHARACTER STRING>{
    FAMILY WORD}<PARTICLE><CHARACTER STRING><PUNCTUATION MARK>|<FAMILY
    INDICATION><PARTICLE><CHARACTER STRING>
    {<FAMILY WORD><PUNCTUATION MARK>}<PARTICLE><CHARACTER
    STRING><PUNCTUATION MARK>|
<FAMILY WORD>::=<NOUN>|<NOUN><READING>|<NOUN><BLANK><READING>|<
    NOUN><START PARENTHESIS><READING><END PARENTHESIS>|<START
    PARENTHESIS><FAMILY WORD
    ><END PARENTHESIS>|
<FAMILY INDICATION>::=ABBREVIATED NAME|NICKNAME|POPULAR NAME|
<RETRIEVAL WORD ROW>::=<RETRIEVAL WORD><READING>|<RETRIEVAL
    WORD><BLANK><READING>|<RETRIEVAL WORD
    ><START PARENTHESIS><READING><END PARENTHESIS>|
    <START PARENTHESIS>::=(|{| 「| 「| [ |(|
    <END PARENTHESIS>::=)|}|」 |」 | ] |)|
<PARTICLE>::=GA|WA|WO|MO|NI|NIWA|
<KANA>::=A|I|.....|N|
<KATAKANA>::=A|I|....|N|
<ALPHANUMERIC>::=a|b|....|z|A|B|...|Z|0|1|....|9|
<CHINESE CHARACTER>::=A|A|........|
<PUNCTUATION MARK>::=。|、|.|,|.|,|:|;|:|;|
<CHARACTER STRING>::={KANA}{CHINESE CHARACTER}|{CHINESE
    CHARACTER}{KANA}|{KANA}{CHINESE CHARACTER}{KANA}|{CHINESE
    CHARACTER}{KANA}{CHINESE CHARACTER}|KANA}{ALPHANUMERIC}{CHINESE
    CHARACTER}|{CHINESE
    CHARACTER}{ALPHANUMERIC}{KANA}|......|{KANA}{ALPHANUMERIC}{CHINESE
    CHARACTER}{ALPHANUMERIC}{KANA}{ALPHANUMERIC}|{CHINESE
    CHARACTER}{ALPHANUMERIC}{KANA}{ALPHANUMERIC}{CHINESE
    CHARACTER}{ALPHANUMERIC}|
<READING>::={KANA}|{KANA}{KATAKANA}|{KATAKANA}{KANA}|{KANA}{KATAKANA}{KANA}
    |{KATAKANA}{KANA}{KATAKANA}|
```

FIG.26

| HEADING | EXTRACTED WEB | READING | FAMILY ATTRIBUTE | CLASSIFICATION ATTRIBUTE | PRESENCE ATTRIBUTE |
|---|---|---|---|---|---|
| CHIIMU | NA | CHIIMU | NA | TITLE | NA |
| TIIMU | NA | TIIMU | NA | TITLE | NA |
| ... | ... | ... | ... | ... | ... |
| SUGITA KAORU | NA | SUGITAKAORU | NA | PERSON | NA |
| ... | ... | ... | ... | ... | ... |
| MUSUME. | http://www.?????.com/ | MUSUMEMARU | f1000D | PERSON | NA |
| TKO MUSUME. | http://www.?????.com/ | TIIKEEOMUSUME | f1000D | PERSON | NA |
| TOKYO NEWS | NA | TOKYO NEWS | NA | TITLE | NA |
| TOKYO MUSUME. | http://www.?????.com/ | TOKYOMUSUMEMARU | f1000M | PERSON | NA |
| T MUSU. | http://www.?????.com/ | TIIMUSU | f1000D | PERSON | NA |
| ... | ... | ... | ... | ... | ... |

177

RETRIEVING APPARATUS, RETRIEVING METHOD, AND COMPUTER PROGRAM PRODUCT

CROSS-REFERENCE TO RELATED APPLICATIONS

This application is based upon and claims the benefit of priority from the prior Japanese Patent Application No. 2007-247995, filed on Sep. 25, 2007; the entire contents of which are incorporated herein by reference.

BACKGROUND OF THE INVENTION

1. Field of the Invention

The present invention relates to a retrieving apparatus, a retrieving method, and a computer program product for retrieving content related to a keyword input by a speech.

2. Description of the Related Art

According to the spread of the broadband, television terminals with which it is possible to use video delivery services (Video On Demand: VOD) for movies and the like through the Internet are spreading. Television terminals including hard disk recorders and storage devices such as a hard disk are also spreading. Television terminals that can not only receive programs but also record the programs are appearing on the market. Besides the television terminals, audio video personal computers (AV-PCs) with high resolution for mainly viewing analog broadcasts and terrestrial digital broadcasts are started to spread. It is possible to record content materials such as received programs in hard disks.

A digital living network alliance (DLNA) guideline that makes it possible to mutually connect apparatuses such as the AV-PCs, the television terminals, and the hard disk recorders is decided. Users of apparatuses conforming to this guideline can view content materials (hereinafter, "contents") recorded in all the apparatuses from the users' own apparatuses.

The users can view an extremely large number of contents as described above. However, in viewing specific content, the users need to retrieve the content desired to be viewed out of the large number of contents. In retrieval of content, in general, an electronic program guide (EPG) simultaneously recorded when contents are recorded is used. The EPG includes information concerning contents, for example, genres such as sports and news and performers. Therefore, it is possible to retrieve content based on these kinds of information.

Methods of operating the AV-PCs, the television terminals, and the hard disk recorders are becoming more complicated according to an increase in functions of the apparatuses. Therefore, an operation method employing speech recognition attracts attention. To retrieve content using speech recognition, "reading" of a word related to the content is necessary. Various technologies have been conventionally proposed as a technology for speech recognition.

For example, JP-A 2004-171174 (KOKAI) discloses a technology for reading out, when a user inputs readings of unknown words not registered yet, a sentence according to the readings. JP-A 2005-227545 (KOKAI) discloses a technology for using, when a reading kana is given to a word in an EPG, the reading kana as a reading of the word. In such speech recognition technologies, to improve accuracy of speech recognition, an "isolated word recognition system" for registering object words in a dictionary and recognizing the words is generally used.

Forms of words tend to change with the use of the words. In particular, people are often called by aliases such as abbreviated names and nicknames as names of people are spoken in more opportunities. Therefore, in the isolated word recognition system, it is impossible to follow a change in pronunciation of a word. As a result, a difference occurs between a reading of the word stored in advance and a present reading (pronunciation) of the same object represented by the word.

Therefore, even when a program recorded in the past and a program presently broadcasted or a program to be broadcasted in future represent the same object, words representing the programs in an EPG can be different. For example, a name representing the same person, the same program title, or the like is described as a formal name in an EPG of programs in the past but is described in another name such as an abbreviated name or a nickname in an EPG of programs at present or in future. In the conventional retrieval technology employing an EPG, when a user tries to retrieve a program using an abbreviated name or a nickname that the user uses, even if the program is present, the user cannot retrieve the program because the program is represented by a name different from the abbreviated name of the nickname in the EPG. On the other hand, when an abbreviated name or a nickname is described in the EPG and the user tries to retrieve a program using a formal name, even if the program is present, the user cannot retrieve the program because the program is represented by the name different from the formal name in the EPG.

It is conceivable to solve the problems described above by manually registering abbreviated names and nicknames using the technology disclosed in JP-A 2004-171174 (KOKAI). However, operation for the registration is complicated because the user needs to register every abbreviated name and nickname. Moreover, when the user does not know readings of aliases such as abbreviated names and nicknames, the user cannot register the aliases.

In general, because the readings are given to only formal names in the EPG, the user cannot acquire readings of aliases of the formal names from the EPG. Therefore, even if the technology disclosed in JP-A 2005-227545 (KOKAI) is used, the problems described above cannot be solved.

SUMMARY OF THE INVENTION

According to one aspect of the present invention, a retrieving apparatus includes a first storing unit that stores a content; a second storing unit that stores a word dictionary in which a plurality of words are registered in association with readings of the words and each of the words representing a formal name and an abbreviated name of the formal name is registered in association with a family attribute among the words; a speech input unit that receives an input of a speech signal; a speech recognizing unit that recognizes a character string corresponding to the speech signal as a keyword; a retrieval-candidate expanding unit that retrieves a word coinciding with the keyword and a word familiar with the word from the word dictionary as a retrieval candidate word; a retrieval-word selecting unit that receives a selection designation that designates any of words included in the retrieval candidate words as a retrieval word; a retrieval-word expanding unit that sets the retrieval word and a word familiar with the retrieval word as expanded retrieval words, based on the word dictionary; and a retrieving unit that retrieves a content related to any of words included in the expanded retrieval words from the first storing unit.

According to another aspect of the present invention, a retrieving method includes receiving an input of a speech signal; recognizing a character string corresponding to the speech signal as a keyword; retrieving a word coinciding with the keyword and a word familiar with the word from a word dictionary as a retrieval candidate word, the word dictionary registering a plurality of words in association with readings of the words and each of words representing a formal name and an abbreviated name of the formal name in association with a family attribute among the words; selecting any of words included in the retrieval candidate words as a retrieval word; setting the retrieval word and a word familiar with the retrieval word as expanded retrieval words, based on the word dictionary; and retrieving a content related to any of words included in the expanded retrieval words.

A computer program product according to still another aspect of the present invention causes a computer to perform the method according to the present invention.

BRIEF DESCRIPTION OF THE DRAWINGS

FIG. 3 is a diagram illustrating the functional structure of a retrieving apparatus according to a first embodiment of the present invention;

FIG. 4 is a diagram illustrating an example of a program list stored in a content-information storing unit shown in FIG. 3;

FIG. 5 is a diagram illustrating an example of additional information stored in a content-material storing unit shown in FIG. 3;

FIG. 6 is a diagram illustrating an example of a word dictionary shown in FIG. 3;

FIG. 7 is a diagram illustrating an example of a speech recognition dictionary shown in FIG. 3;

FIG. 9 is a flowchart of a procedure of speech recognition processing shown in FIGS. 8A and 8B;

FIG. 15 is a diagram illustrating an example of a word dictionary shown in FIG. 14;

FIG. 19 is a diagram illustrating an example of a word dictionary master shown in FIG. 18;

FIG. 20 is a diagram illustrating an example of a word dictionary shown in FIG. 18;

FIG. 21 is a diagram illustrating an example of the word dictionary after update;

FIG. 23 is a diagram illustrating an example of a connection destination table shown in FIG. 22;

FIG. 24A is a diagram illustrating an example of a retrieval result obtained by a Web server shown in FIG. 22;

FIG. 24B is a diagram illustrating an example of a retrieval result obtained by the Web server shown in FIG. 22;

FIG. 24C is a diagram illustrating an example of a retrieval result obtained by the Web server shown in FIG. 22;

FIG. 25 is a diagram illustrating an example of a family analysis rule shown in FIG. 22; and FIG. 26 is a diagram illustrating another form of a word dictionary shown in FIG. 22.

DETAILED DESCRIPTION OF THE INVENTION

Exemplary embodiments of the present invention are explained in detail below with reference to the accompanying drawings.

In the embodiments explained below, the present invention is applied to a retrieving apparatus mounted on a TV terminal, an AV-PC, and the like. However, objects to which the present invention is applied are not limited to this form.

Figure 1:
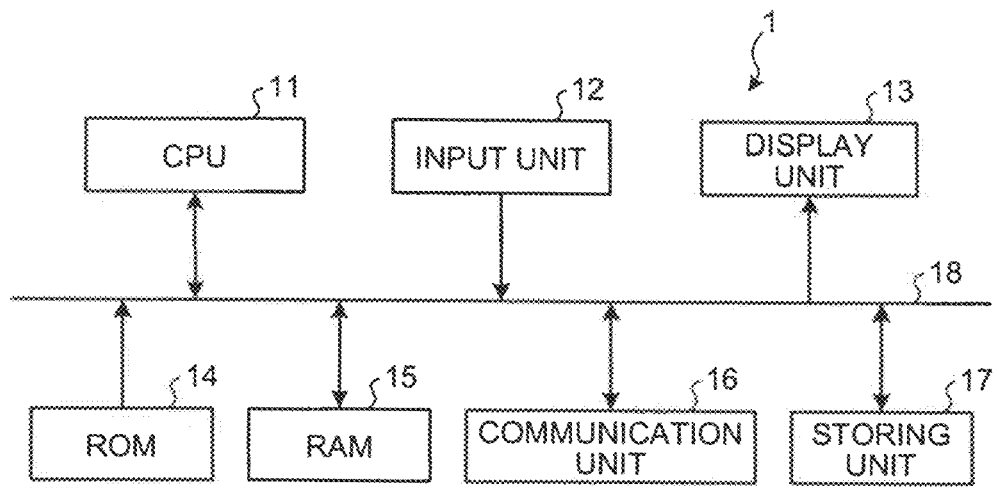
FIG. 1 is a diagram illustrating a hardware configuration of a retrieving apparatus.

A retrieving apparatus 1 according to a first embodiment of the present invention is explained referring to FIG. 1. FIG. 1 is a block diagram illustrating a hardware configuration of the retrieving apparatus 1. As shown in FIG. 1, the retrieving apparatus 1 includes a central processing unit (CPU) 11, an input unit 12, a display unit 13, a read only memory (ROM) 14, a random access memory (RAM)) 15, a communication unit 16, and a storing unit 17, which are connected by a bus 18. Retrieving apparatuses 2 to 4 described later have hardware configurations same as the hardware configuration of the retrieving apparatus 1.

The CPU 11 executes, using a predetermined area of the RAM 15 as a work area, various kinds of processing in cooperation with various control programs stored in the ROM 14 or the storing unit 17 in advance and collectively controls operations of the respective units of the retrieving apparatus 1.

The CPU 11 realizes a plurality of functional units having predetermined functions in cooperation with predetermined programs stored in the ROM 14 or the storing unit 17 in advance. Details of the respective functional units are described later.

The input unit 12 includes operation buttons and a speech input device. The input unit 12 receives content input by a user as an indication signal and outputs the indication signal to the CPU 11.

Figure 2:
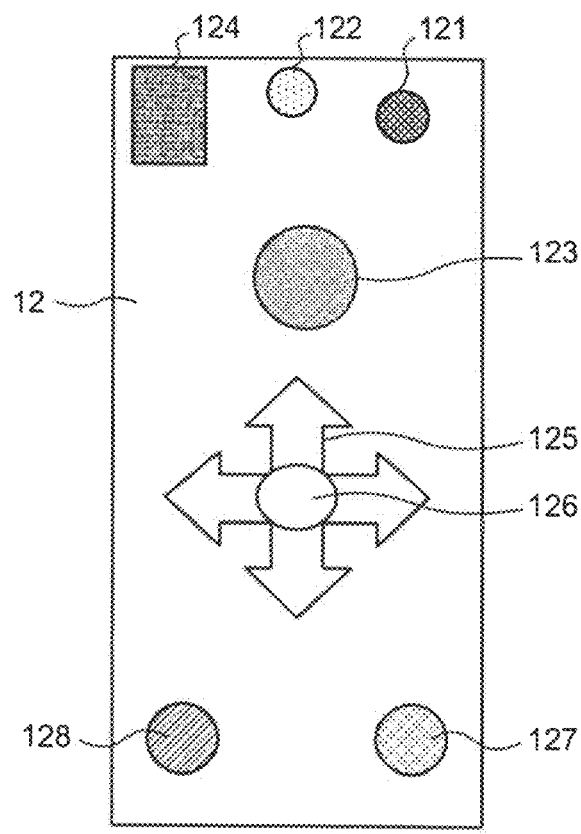
FIG. 2 is a diagram illustrating an external structure of an input unit shown in FIG. 1.

FIG. 2 is a diagram illustrating an example of the input unit 12. An external structure of the input unit 12 formed in a remote controller type is shown in FIG. 2. In the figure, a power button 121 is a changeover switch for switching on and off the retrieving apparatus 1. The user can shift the retrieving apparatus 1 to an ON state, in which the retrieving apparatus 1 can perform retrieval, by depressing the power button 121.

A microphone 122 is a speech input device. When speech is input to the microphone 122 while a retrieval button 123 is depressed, a speech signal of the speech is output to a receiving unit 21 described later.

The retrieval button 123 is an instruction button for instructing the retrieving apparatus 1 to execute retrieval processing. The retrieving apparatus 1 executes various operations related to retrieval of content using the respective functional units described later according to a depression signal of the retrieval button 123. A speaker 124 is a speech output device such as a speaker or a buzzer. The speaker 124 outputs operation speech or alarm speech according to operation by the user.

A selection button 125 is selecting means for selecting an item desired by the user from a display screen displayed on the display unit 13. A determination button 126 is instructing means for deciding an item selected by the selection button 125. When the determination button 126 is depressed, a designation signal for designating the item selected by the selection button 125 is output to a retrieval-word selecting unit 25 or a reproduction control unit 28 described later.

A return button 127 is instructing means operated, for example, when a screen displayed on the display unit 13 is returned to an immediately preceding screen or when processing is returned to immediately preceding processing. A help button 128 is instructing means for instructing display of the use and an explanation concerning content retrieval operation performed by using the input unit 12. When the help button 128 is depressed, the CPU 11 reads out a help file (not shown), in which the use and an explanation concerning the content retrieval operation are described, stored in the storing unit 17 and causes the display unit 13 to display the help file.

When the input unit 12 is the remote controller type as shown in FIG. 2, the input unit 12 and the retrieving apparatus 1 can be connected by wire or can be connected by radio. A form of the input unit 12 is not limited to the remote controller type and can be provided integrally with the retrieving apparatus 1.

Returning to FIG. 1, the display unit 13 includes a display device such as a liquid crystal display (LCD). The display unit 13 displays various kinds of information based on a display signal from the CPU 11.

The ROM 14 stores programs, various kinds of setting information, and the like related to the control by the retrieving apparatus 1 so as not to be rewritable.

The RAM 15 is a volatile storage device such as a synchronous dynamic random access memory (SDRAM). The RAM 15 functions as a work area of the CPU 11 and plays a role of a butter that temporarily stores various kinds of information.

The communication unit 16 is an interface that communicates with an external apparatus through a not-shown network. The communication unit 16 outputs received various kinds of information to the CPU 11 and transmits various kinds of information output from the CPU 11 to the external apparatus. The communication unit 16 also has a function of a receiving apparatus that receives broadcast of a program from a not-shown broadcasting station.

The storing unit 17 includes a magnetically or optically recordable storage medium. The storing unit 17 stores programs, various kinds of setting information, and the like related to the control by the retrieving apparatus 1 so as to be rewritable. The storing unit 17 stores a content storing unit 171, a word dictionary 172, a speech recognition dictionary 173, and the like described later in a storage area thereof in advance.

Referring to FIG. 3, the respective functional units of the retrieving apparatus 1 realized by cooperation of the CPU 11 and the programs stored in the ROM 14 or the storing unit 17 are explained. FIG. 3 is a block diagram illustrating the functional structure of the retrieving apparatus 1.

As shown in FIG. 3, the retrieving apparatus 1 includes a receiving unit 21, a speech recognizing unit 22, a speech-recognition-dictionary creating unit 23, a word expanding unit 24, a retrieval-word selecting unit 25, a content retrieving unit 26, a content selecting unit 27, a reproduction control unit 28, a content receiving unit 29, and a date-and-time measuring unit 30. The storing unit 17 stores the content storing unit 171 and the word dictionary 172.

Various kinds of information stored in the storing unit 17 is explained. The content storing unit 171 is a storage area in which contents retrievable by the retrieving apparatus 1 are stored. The content storing unit 171 includes a content-information storing unit 1711 that stores a program list of a television and the like and a content-material storing unit 1712 that stores recorded content materials such as moving images, photographs, and music.

The program list stored in the content-information storing unit 1711 is electronic program guide data called EPG. The program list is described in an eXtensible Markup Language (XML) format as shown in FIG. 4.

FIG. 4 is a diagram illustrating an example of the electronic program guide data stored in the content-information storing unit 1711. In the figure, a tag "<?xml version="1.0" encoding="UTF-8"?>" indicates that the electronic program guide data is described in the XML format. The following tags from "<epgdata>" to "</epgdata>" at the end of a sentence indicate a text of the electronic program guide data.

A tag "<contents cnt="3802">" indicates an ID of acquired electronic program guide data. A tag "<dt dy="2005/10/08"/>" indicates that the electronic program guide data is delivered on Oct. 8, 2005. A tag "<ch cd="A044001"/>" indicates a channel code and indicates that the channel code is A04401.

A tag "<program>" indicates that program data concerning a TV program follows. The end of the program data is a tag "</program>". The tags from "<program>" to "</program>" represent one program (content). Programs between the tags "<program>" and "</program>" in the same format follow the program data. In this embodiment, information concerning the respective programs described in the electronic program guide data is independent content (content material) and treated in the same manner as the content material (moving image data and music data) stored in the content-material storing unit 1712.

In a first program, a tag "<dt>2005/10/08</dt>" indicates a broadcast date when this program is broadcasted. A tag "<ch>A044001<ch>" indicates a channel code and a tag "<bc>NNN Sogo</bc>" indicates a channel name. A tag "<st>13:00</st>" indicates a program start time and a tag "<et>13:15</et>" indicates a program end time.

A tag "<gb>00</gb>" indicates a genre of a program. A tag "<tn>news</tn>" indicates a program title. A tag "<cn> . . . </cn>" indicates content of the program. In other words, in the electronic program guide data, information concerning content (a program) that can be reproduced at predetermined date and time is stored.

In this embodiment, "00" of "<gb>00</gb>" indicates a news program. In the next program, "30" of "<gb>30</gb>" indicates a drama as a genre of the program.

A tag "<bm>[multi][character]</bm>" indicates a broadcast format and indicates a speech multiplex and teletex broadcast. A tag "<gt>[author]Doi Miwako[performer]Sugita Kaoru[performer]Matoba Tsukasa</gt>" briefly indicates names of people involved in production of this program. "[author]" indicates an author of this drama and "[performer]" indicates a performer.

Between tags "<go>" and "</go>", names of people involved in production of this program are entered. A tag "<nn . . . />" indicates an author of this program (drama). A name of the author (e.g., Doi Miwako) is entered in "na=". A tag "<pp . . . />" indicates a performer of this program. A person's name of the performer (e.g., Sugita Kaoru) is entered in "na=". In each of the tags, a character string (e.g., sugitakaoru) indicated by "yo=" indicates "reading" of the person's name. A tag "<co> . . . </co>" indicates an outline of this program.

In the next program, "40" of "<gb>40</gb>" indicates a music program as a genre of a program. In this program, "<stn> . . . </stn>" indicates a subtitle of this program. A tag "<pp> . . . </pp>" briefly indicates a performer of this program. "[guest]" indicates a guest of this music program and "[mc]" indicates an emcee of this music program.

As described above, in the electronic program guide data, there are various programs in which readings are given to persons' names. In general, readings are often given to persons' names when a program genre is a drama. In some case, persons' names are written while being delimited by tags for each of the persons' names. However, in general, persons' names are often written in a form of a list in a program outline, a subtitle, and the like. It is assumed that the electronic program guide data is received from an external apparatus at every predetermined time according to the control by the content receiving unit 29 described later and is updated to new electronic program guide data including broadcast contents for a predetermined period (e.g., two weeks).

On the other hand, in the content-material storing unit 1712, content materials that can be always reproduced such as recorded moving image data and music data are stored as contents. A part or all of the electronic program guide data (EPG) shown in FIG. 4 are stored as additional information in association with contents recorded by receiving broadcasts.

FIG. 5 is a diagram illustrating an example of additional information stored in association with the respective contents of the content-material storing unit 1712. As shown in FIG. 5, the additional information includes a media type (media) representing a broadcasting station that broadcasts content (program data), a file format, or the like, recording date and time (recording date, start time, and end time), a program title (title), a program performer of the content (performer), an address of a thumbnail image (thumbnail) representing a screen of the content, address information (body) in which a content body is present, and detailed information (details) concerning content such as program content. The additional information is associated with content corresponding thereto by the address stored in "thumbnail" or "body". "Address" indicates an address each of the kinds of additional information (a storage address) and is automatically given when each of the kinds of additional information are registered.

In FIG. 5, a first row (address: c201) is additional information concerning content, a program genre of which is a news program. An item of the performer is "NULL (not applicable)" because there is no information corresponding to the performer.

A second row (address: c215) is additional information concerning content, a program genre of which is a music program. As explained in the example of the electronic program guide data shown in FIG. 4, an identifier "[performer]" is not given to performers in the case of a music program and the performers are listed in the subtitle or the like. Therefore, when processing higher in level than tag analysis for extracting a person's name is not performed, only the persons' names indicated by the "<pp>" tag are stored as performers.

A third row (address: c233) is additional information concerning content extracted from a music medium such as a compact disk (CD). The additional information is "NULL (not applicable)" because a performer and a thumbnail are not present.

The word dictionary 172 is dictionary information used in word expansion processing described later executed by the word expanding unit 24. As shown in FIG. 6, for each of "headings" of respective words, "reading", "family attribute", and "classification attribute" of the word are registered in association with one another.

The family attribute is information representing a parent-child relation among the words. Specifically, the family attribute represents a relation between a formal name and an alias such as an abbreviated word or a nickname of the name. For example, in a heading "Tokyo Musume.", the family attribute is "f1000M". "f1000" of "f1000M" is identification information (family information) for identifying a group of words having the same word (a formal name) as a parent. Common family information is given to the words in the same group. "M" indicates a word as the origin of a word (Mother) of this group, i.e., the formal name. It is assumed that pieces of family information different from each other are given to respective words, which are formal names.

"D" is given to words other than the formal name instead of "M". For example, in a heading "T Musu.", the family attribute is "f1000D". This indicates that "T Musu." is a child (Daughter) of the family "f1000M", i.e., an alias of "Tokyo Musume.". The family attribute is not given to words not having aliases. "NA" meaning non-application of the family attribute is given to the words.

In the classification attribute, field names of objects represented by the respective words are registered. The respective words are classified by these field names. In an example shown in FIG. 6, "person" and "title" are field names. However, the field names are not limited to these and other field names such as "entertainer" and "others" can be used.

The speech recognition dictionary 173 is dictionary information used in the speech recognition processing performed by the speech recognizing unit 22. As shown in FIG. 7, for each "lexis", "dictionary number" and "pronunciation" and "part of speech" of the lexis are registered in association with each other.

In FIG. 7, "dictionary number" is identification information automatically given to each of words when the word is registered. A peculiar number is given to the word. "Lexis" is equivalent to a heading of a word. "Pronunciation" is equivalent to "reading" of the word. "Part of speech" represents a part of speech of the word. In FIG. 7, all "parts of speech" are proper nouns because all the words are proper nouns.

The receiving unit 21 receives various indication signals related to retrieval of content input from the input unit 12. Specifically, the receiving unit 21 receives an indication signal indicating depression of the retrieval button 123 of the input unit 12. Then, the receiving unit 21 causes the display unit 13 to display a screen (a GUI) that urges input of a keyword as a retrieval object. The receiving unit 21 AD-converts an analog speech signal input via the microphone 122 of the input unit 12 and outputs a converted digital speech signal to the speech recognizing unit 22. When the input unit 12 is the remote controller type as shown in FIG. 2, the input unit 12 can include a section related to the AD conversion.

The speech recognizing unit 22 applies fast Fourier transform (FFT) or the like to a digital speech signal input from the receiving unit 21 to extract a characteristic amount of the speech signal. The speech recognizing unit 22 performs matching of the characteristic amount extracted from the speech signal and respective lexes registered in the speech recognition dictionary 173 using a technology such as the hidden Markov model (HMM) to recognize (a group of) words corresponding to the speech signal as retrieval object keywords, respectively.

The speech-recognition-dictionary creating unit 23 registers, based on the respective words registered in the word dictionary 172, the respective words (lexes), pronunciations (readings), and parts of speech in the speech recognition dictionary 173 in association with one another to create the speech recognition dictionary 173. For example, a publicly-known method disclosed in JP-A 2007-047412 (KOKAI) can be used for the creation of the speech recognition dictionary 173.

Specifically, the speech-recognition-dictionary creating unit 23 compares the respective words registered in the word dictionary 172 and a not-shown pronunciation dictionary that defines pronunciation of lexes. The speech-recognition-dictionary creating unit 23 identifies words coinciding with the lexes defined in the pronunciation dictionary among the words registered in the word dictionary 172 as registration object words to be registered in the speech recognition dictionary 173. The speech-recognition-dictionary creating unit 23 identifies parts of speech of registration object lexes based on a not-shown part-of-speech dictionary that defines parts of speech of the respective lexes. The speech-recognition-dictionary creating unit 23 gives a peculiar dictionary number to each of the registration object lexes and registers the dictionary number, the lexis corresponding to the dictionary number, and a pronunciation and a part of speech of the lexis in the speech recognition dictionary 173 in association with one another.

The word expanding unit 24 retrieves, based on a character string of a keyword input from the speech recognizing unit 22, a word coinciding with the keyword and retrieves, based on a family attribute associated with the word, another word (a family word) tied to the word from the word dictionary 172. The word expanding unit 24 causes the display unit 13 to display the word retrieved from the word dictionary 172 as a retrieval candidate word. The word expanding unit 24 sets a retrieval word described later input from the retrieval-word selecting unit 25 and a family word tied to the retrieval word as expanded retrieval words, which are retrieval objects, and outputs the expanded retrieval words to the content retrieving unit 26.

The retrieval-word selecting unit 25 receives, from the input unit 12 (the selection button 125 and the determination button 126), an indication signal for selecting a specific word from the retrieval candidate words displayed on the display unit 13. The specific word selected from the group of retrieval candidate words is referred to as retrieval word.

The content retrieving unit 26 retrieves, based on the expanded retrieval words input from the word expanding unit 24, content including any one of words included in the expanded retrieval words from the content-information storing unit 1711 and the content-material storing unit 1712 of the content storing unit 171.

Specifically, the content retrieving unit 26 judges whether a character string coinciding with any one of the words included in the expanded retrieval words is present in information such as program titles included in respective contents written in a program guide of the content-information storing unit 1711 and information such as program titles included in additional information of respective contents stored in the content-material storing unit 1712. The content retrieving unit 26 causes the display unit 13 to display, concerning content judged as including a character string coinciding with any one of the expanded retrieval words, a thumbnail image, information, and the like related to the content.

The content selecting unit 27 receives, from the input unit 12 (the selection button 125 and the determination button 126), an indication signal for selecting specific content from respective contents displayed on the display unit 13 according to the control by the content retrieving unit 26.

The reproduction control unit 28 causes the display unit 13 to display various GUIs for supporting operation of the retrieving apparatus 1. The reproduction control unit 28 controls reproduction of content selected via the content selecting unit 27.

Specifically, the reproduction control unit 28 judges in which of the content-information storing unit 1711 and the content-material storing unit 1712 the content selected via the content selecting unit 27 is stored. When it is judged that the selected content is stored in the content-material storing unit 1712, the reproduction control unit 28 reproduces the content and causes the display unit 13 to display the content.

When it is judged that the selected content is stored in the content-information storing unit 1711, i.e., when the selected content is a program described in the electronic program guide data, the reproduction control unit 28 refers to a broadcast date, start time, and end time of the program and compares the broadcast time, the start time, and the end time with present date and time measured by the date-and-time measuring unit 30. It is assumed that the broadcast date, the start time, and the end time of the program are acquired from a character string section indicated by the respective tags "<dt> ... </dt>", "<st> ... </st>", and "<et> ... </et>" of the electronic program guide data shown in FIG. 4.

When it is judged that the broadcast date, the start time, and the end time of the selected program (content) overlap the present date and time in time series, the program is a program presently being broadcasted. Therefore, the reproduction control unit 28 causes the content receiving unit 29 to receive a broadcast of the program and causes the display unit 13 to display content of the program. When it is judged that the broadcast date and the start time of the selected program are further in the past than the present date and time, reproduction of the program is impossible. Therefore, the reproduction control unit 28 causes the display unit 13 to display information indicating to that effect.

When it is judged that the broadcast date and the start time of the selected program are further in the future than the present date and time, i.e., it is judged that the selected program is a program scheduled to be broadcasted, the reproduction control unit 28 schedules recording of the program based on broadcast scheduled date and time written in the electronic program guide data. When the program recording is scheduled in this way, the reproduction control unit 28 causes the content receiving unit 29 to receive the program at the broadcast date and time of the program and starts recording of the program. Recording means storing actual data (video data and speech data) of the program and electronic program guide data (additional information) of the program in the content-material storing unit 1712 in association with each other.

The content receiving unit 29 receives, based on the electronic program guide data stored in the content-information storing unit 1711, the broadcast of the program instructed by the reproduction control unit 28.

The date-and-time measuring unit 30 measures present date and time based on a clock signal generated from a not-shown clock generator or the like.

Figure 8A:
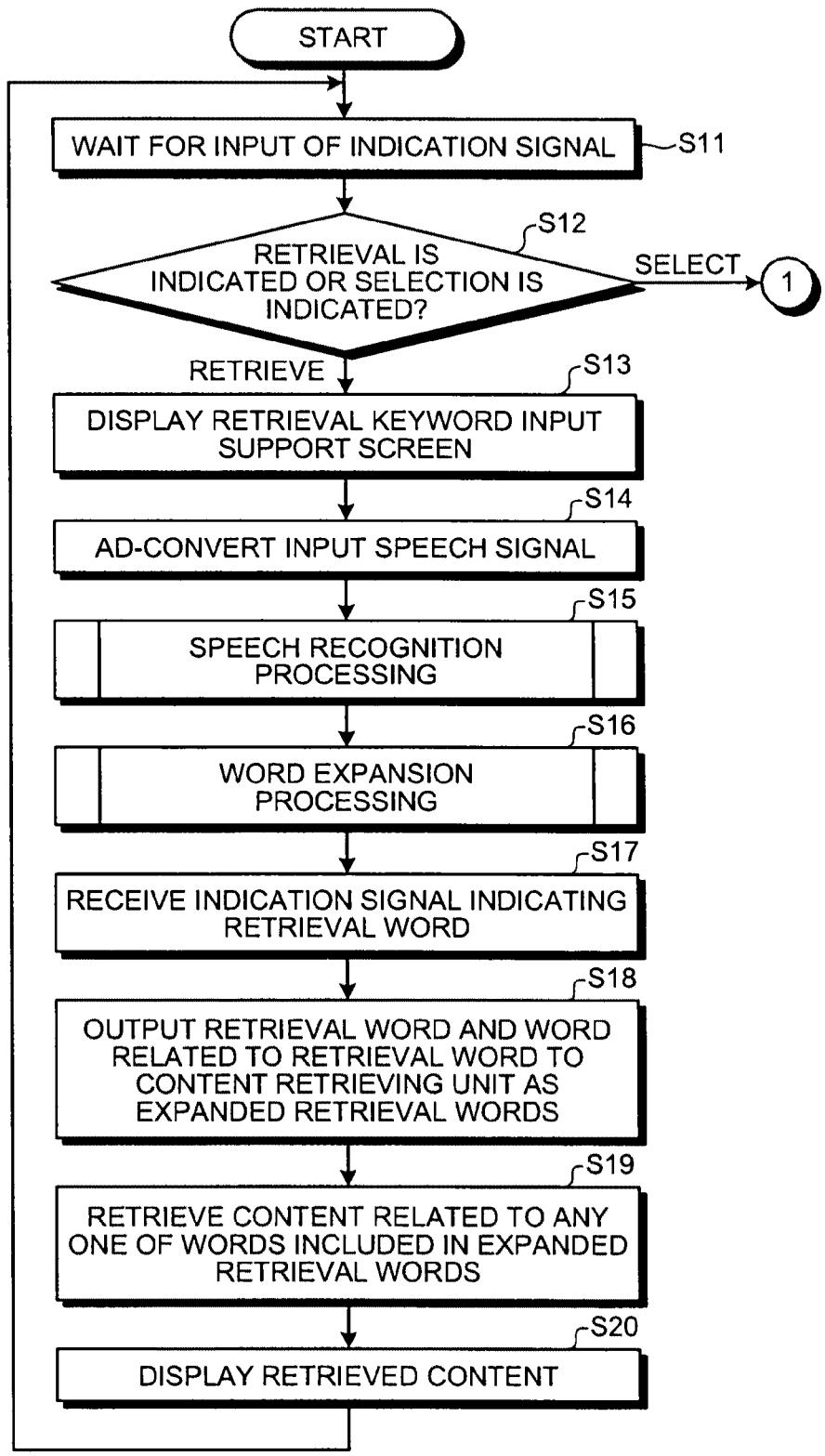
FIGS. 8A and 8B are flowcharts of a procedure of content retrieval and reproduction processing according to the first embodiment.
Figure 8B:
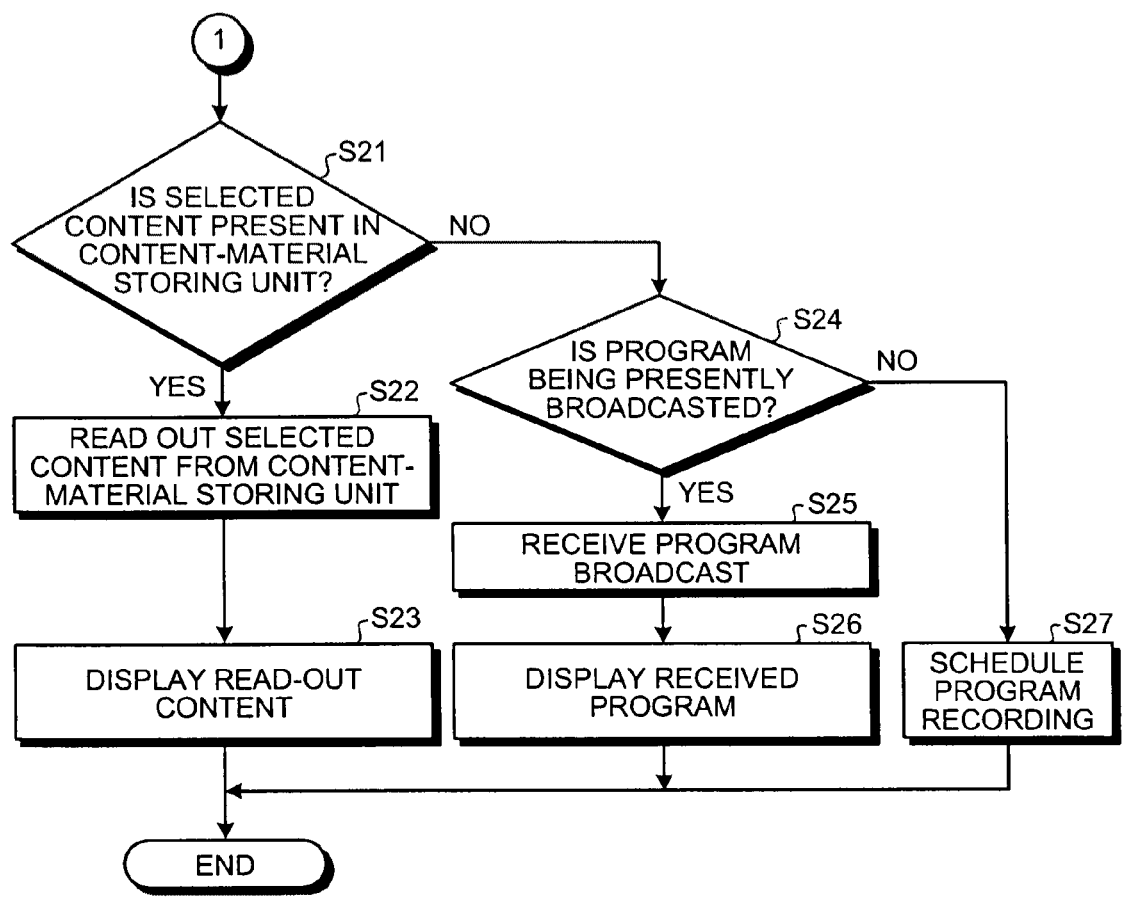

FIGS. 8A and 8B are flowcharts of a procedure of content retrieval and reproduction processing executed by the respective functional units of the retrieving apparatus 1.

First, the receiving unit 21 is on standby until an indication signal is input from the input unit 12 (step S11). In this state, the receiving unit 21 judges that an indication signal indicating that the retrieval button 123 of the input unit 12 is depressed is received ("retrieve" at step S12). Then, the receiving unit 21 causes the display unit 13 to display a screen for urging input of a retrieval object keyword (step S13).

Subsequently, during input of indication information indicating that the retrieval button 123 is depressed, the receiving unit 21 receives a speech signal input to the microphone 122. The receiving unit 21 AD-converts the speech signal and outputs the speech signal to the speech recognizing unit 22 (step S14). At step S14, the speech recognizing unit 22 executes speech recognition processing based on the digital speech signal AD-converted at step S14 (step S15).

FIG. 9 is a flowchart of a procedure of the speech recognition processing at step S15.

The speech recognizing unit 22 applies FFT or the like to the digital speech signal AD-converted at step S14 to extract a characteristic amount of the speech signal (step S151). Subsequently, the speech recognizing unit 22 performs, using a technology such as HMM, matching of the characteristic amount extracted at step S151 and pronunciations of the respective lexes registered in the speech recognition dictionary 173 to specify (a group of) lexes corresponding to the speech information from the speech recognition dictionary 173 as keywords, respectively (step S152).

The speech recognizing unit 22 outputs the keywords specified at step S152 to the word expanding unit 24 (step S153) and shifts to the processing at step S16 in FIG. 8A.

Referring back to FIGS. 8A and 8B, the word expanding unit 24 executes word expansion processing based on the keywords input from the speech recognizing unit 22 (step S16).

Figure 10:
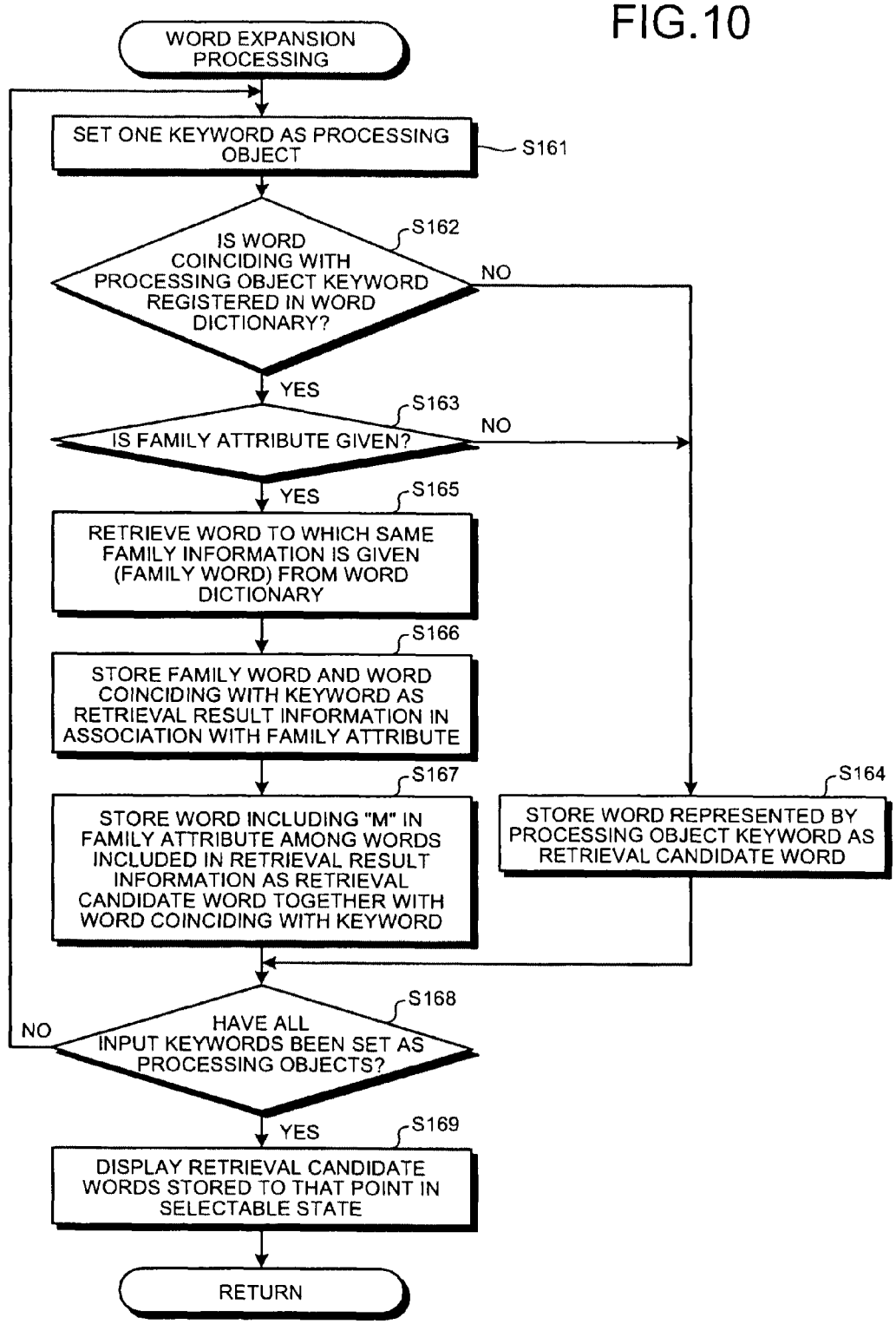
FIG. 10 is a flowchart of a procedure of word expansion processing shown in FIGS. 8A and 8B.

FIG. 10 is a flowchart of a procedure of the word expansion processing at step S16. The word expanding unit 24 sets one of the keywords input from the speech recognizing unit 22 as a processing object (step S161). The word expanding unit 24 judges whether a word coinciding with the keyword is registered in the word dictionary 172 (step S162). When it is judged that a word coinciding with the processing object keyword is registered in the word dictionary 172 ("No" at step S162), the word expanding unit 24 stores a word represented by the processing object keyword as a retrieval candidate word (step S164) and shifts to processing at step S168.

On the other hand, when it is judged at step S162 that a word coinciding with the processing object keyword is registered in the word dictionary 172 ("Yes" at step S162), the word expanding unit 24 judges whether a family attribute is given to the word (step S163). When it is judged that a family attribute is not given to the word ("No" at step S163), the word expanding unit 24 stores a word represented by the processing object keyword as a retrieval candidate word (step S164) and shifts to processing at step S168.

When it is judged at step S163 that a family attribute is given to the word ("Yes" at step S163), the word expanding unit 24 retrieves, based on the family attribute of the word, another word (a family word) having family information same as family information of the family attribute from the word dictionary 172 (step S165). The word expanding unit 24 stores the family word retrieved at step S165 and the word coinciding with the processing object keyword in association with the family attributes of the respective words (step S166). The words stored at step S166 are hereinafter referred to as retrieval result information.

When the processing object keyword is "T Musu.", because "T Musu." is registered in the word dictionary 172, the word expanding unit 24 judges whether a family attribute is given to the processing object keyword.

A family attribute of "T Musu." registered in the word dictionary 172 is "f1000D". Therefore, the word expanding unit 24 retrieves, from the word dictionary 172, a family word to which family information same as family information of the family attribute is given. Because family information of "T Musu." is "F1000", a word to which "f1000" is given, i.e., "Tokyo Musume." (f1000M), "Musume." (f1000D), and "TKO Musume." (f1000D) are retrieved as family words.

At step S166, the word expanding unit 24 stores the retrieved family words and a word corresponding to the processing object keyword in association with family attributes of the respective words. In other words, "(T Musu., f1000D)", "(Tokyo Musume., f10000M)", "(Musume., f1000D)", and "(TKO Musume., f1000D)" are stored as retrieval result information.

The word expanding unit 24 stores family words including "M", which means the origin of a word, in the retrieval result information stored at step S166 as retrieval candidate words together with the word corresponding to the processing object keyword (step S167) and shifts to processing at step S168. When the processing object keyword coincides with a family words including "M", i.e., when the processing object keyword represents a formal name of a specific object, the word expanding unit 24 stores only the word corresponding to the keyword as a retrieval candidate word.

At the following step S168, the word expanding unit 24 judges whether all keywords input from the speech recognizing unit 22 have been set as processing objects. When it is judged that an unprocessed keyword is present ("No" at step S168), the word expanding unit 24 shifts to step S161 and sets the unprocessed keyword as a processing object.

On the other hand, when it is judged at step S168 that all the keywords have been set as processing objects ("Yes" at step S168), the word expanding unit 24 causes the display unit 13 to display respective words stored as retrieval candidate words to that point in a selectable state (step S169) and shifts to processing at step S17.

It is assumed that, at step S14, speech information "tiimusu" is received by the receiving unit 21. The speech recognizing unit 22 executes the speech recognition processing at step S15 based on the speech information "tiimusu". It is assumed that three pronunciations "tiimusu", "chiimu", and "tiimu" match. The speech recognizing unit 22 specifies, from the speech recognition dictionary 173, lexes "T Musu.", "Chiimu", and "Tiimu" corresponding to these pronunciations as keywords, respectively.

The word expanding unit 24 executes word expansion processing for the keywords "T Musu.", "Chiimu", and "Tiimu" input from the speech recognizing unit 22. Concerning the keyword "T Musu.", because the keyword is registered in the word dictionary 172, the word expanding unit 24 proceeds to judgment on whether a family attribute is added (step S163).

The family attribute of "T Musu." registered in the word dictionary 172 is "f1000D". In other words, instead of "M" representing the origin of a word, "D" representing an alias of "M" is included in the family attribute. Therefore, the word expanding unit 24 reads out the family word "Tokyo Musume." (f1000M) having family information (f1000) same as the family attribute and including "M", which means the origin of a word, in the family attribute from the word dictionary 172 and stores the family word "Tokyo Musume." as a retrieval candidate word together with the keyword "T Musu.".

On the other hand, concerning the keyword "Chiimu", the keyword is registered in the word dictionary 172 ("Yes" at step S162) but a family attribute thereof is not registered ("No" at step S163). Therefore, the word expanding unit 24 stores the keyword "Chiimu" as a retrieval candidate word. Concerning the keyword "Tiimu", the keyword is registered in the word dictionary 172 ("Yes" step S162) but a family attribute of which is not registered ("No" at step S163).

Therefore, the word expanding unit 24 stores the keyword "Tiimu" as a retrieval candidate word.

When all the keywords are set as processing objects, the word expanding unit 24 causes the display unit 13 to display the retrieval candidate words stored to that point in a selectable state. In other words, the word expanding unit 24 displays, on the display unit 13, "T Musu.", "Tokyo Musume.", "Chiimu", and "Tiimu" as a group of retrieval candidate words with respect to the speech information "tiimusu" input via the microphone 122.

Figure 11A:
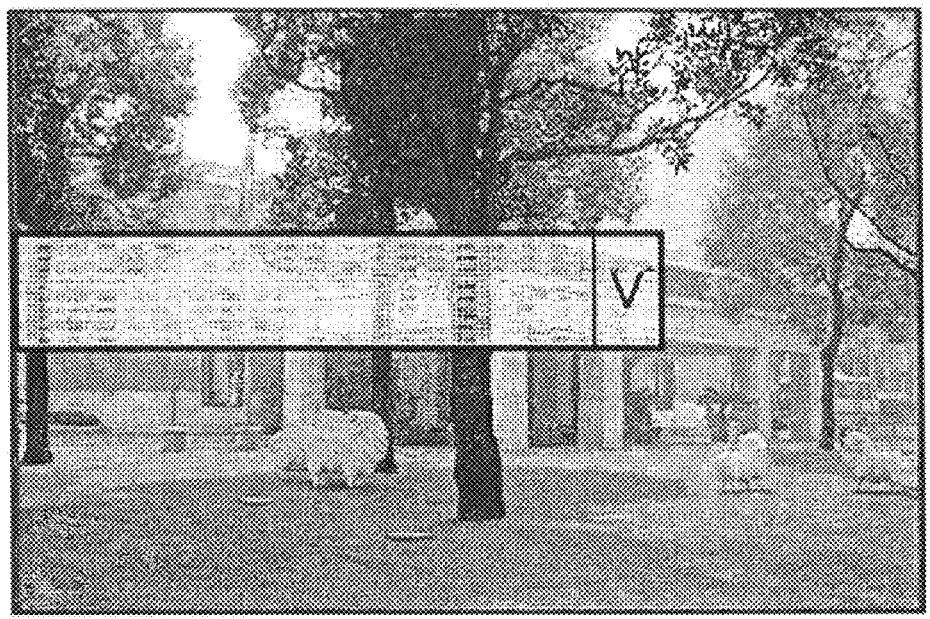
FIG. 11A is a diagram illustrating an example of a screen for display of retrieval candidate words.
Figure 11B:
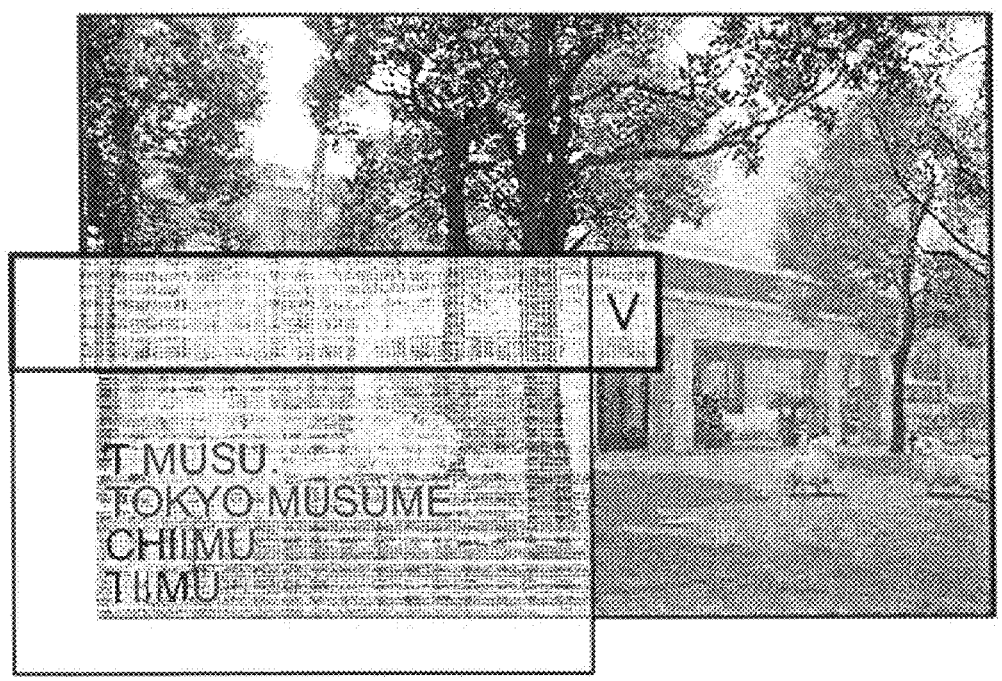
FIG. 11B is a diagram illustrating an example of the screen for display of retrieval candidate words.

FIGS. 11A and 11B are diagrams for explaining the retrieval candidate words displayed on the display unit 13. FIG. 11A is a diagram illustrating an example of a screen displayed on the display unit 13 according to the control by the reproduction control unit 28 when the retrieval button 123 is depressed (step S12). In this display screen, when a speech signal "tiimusu", which is a pronunciation of the retrieval object, is input to the microphone 122 while the retrieval button 123 is depressed, the speech recognition processing (step S15) and the word expansion processing (step S16) are executed. The word expanding unit 24 causes the display unit 13 to display, as shown in FIG. 11B, "T Musu.", "Tokyo Musume.", "Chiimu", and "Tiimu" as retrieval candidate words in the screen of the display unit 13.

The user is capable of selecting a specific word from the retrieval candidate words displayed on the display unit 13 via the selection button 125 and the determination button 126 of the input unit 12. The selected specific word is received as a retrieval word by the retrieval-word selecting unit 25. A plurality of words can be selected as retrieval words.

Referring back to FIGS. 8A and 8B, the retrieval-word selecting unit 25 receives designation information designating a retrieval word out of the retrieval candidate words from the input unit 12 and outputs the retrieval word to the word expanding unit 24 (step S17).

When the retrieval word is input from the retrieval-word selecting unit 25, the word expanding unit 24 specifies, from the retrieval result information, a family word to which family information same as family information of the retrieval word is given and outputs the retrieval word and the family word of the retrieval word to the content retrieving unit 26 as expanded retrieval words (step S18). In this embodiment, the retrieval result information stored at step S166 of step S16 is used. However, a family word tied to a retrieval word can be retrieved from the word dictionary 172 again.

For example, when "T Musu." is input as a retrieval word, "Tokyo Musume.", "Musume.", and "TKO Musume." are read out as family words based on family information of the retrieval word "T Musu.". When a retrieval word has no family information, only the retrieval word is output to the content retrieving unit 26.

At the following step S19, the content retrieving unit 26 retrieves, based on the expanded retrieval words input from the word expanding unit 24, content related to any one of words included in the expanded retrieval words from the program guide stored in the content-information storing unit 1711 and the additional information of the respective contents stored in the content-material storing unit 1712 (step S19).

For example, when "T Musu.", "Tokyo Musume.", "Musume.", and "TKO Musume." are input as retrieval words, content including a character string of any one of these words is retrieved.

Content can be retrieved based on only the retrieval word "T Musu." received by the retrieval-word selecting unit 25 without performing the processing at step S18. When content is retrieved in this way, a retrieval result is "not applicable" because a character string of "T Musu." is not included in both the program guide shown in FIG. 4 and the additional information shown in FIG. 5. In other words, regardless of the fact that "Tokyo Musume.", which is the formal name of "T Musu.", is registered in the additional information shown in FIG. 5, content cannot be retrieved because "Tokyo Musume." is a character string different from "T Musu.".

On the other hand, when the family words of the retrieval word "T Musu." are included in the expanded retrieval words according to the processing at step S18, "Tokyo Musume.", which is the formal name of "T Musu.", and "Musume." and "TKO Musume", which are other aliases, can also be set as retrieval words. Therefore, even when the same object has a plurality of names, it is possible to retrieve contents related to the respective names based on the names and surely retrieve contents related to the object.

At the following step S20, the content retrieving unit 26 causes the display unit 13 to display the respective contents retrieved at step S19 in a selectable state (step S20) and returns to the processing at step S11. When relevant content is not retrieved in the retrieval processing at step S19, information indicating to that effect is displayed on the display unit 13.

Figure 12:
FIG. 12 is a diagram illustrating an example of a screen on which a retrieval result is displayed.

FIG. 12 is a diagram illustrating an example of a screen displayed on the display unit 13 according to the processing at step S20. A retrieval result concerning "Tokyo Musume." is shown in the figure. Because "Tokyo Musume." is included in the performer in the address c215 shown in FIG. 5, related information such as a thumbnail of this content is displayed on the display unit 13.

Referring back to FIGS. 8A and 8B, at step S81, an indication signal for selecting processing object content from the list of contents displayed at step S20 is received by the content selecting unit 27 ("select" at step S12), the reproduction control unit 28 judges whether the selected content is stored in the content-material storing unit 1712 (step S21).

When it is judged at step S21 that the selected content is stored in the content-material storing unit 1712 ("Yes" at step S21), the reproduction control unit 28 reads out relevant content from the content-material storing unit 1712 (step S22). Subsequently, the reproduction control unit 28 reproduces the read-out content to cause the display unit 13 to display the content (step S23) and finishes this processing.

On the other hand, when it is judged at step S21 that the selected content is stored in the content-information storing unit 1711, i.e., when it is judged that the selected content is a program described in the electronic program guide data ("No" at step S21), the reproduction control unit 28 compares a broadcast date, start time, and end time of the program and the present date and time (step S24).

When it is judged that the broadcast date, the start time, and the end time of the selected program and the present date and time overlap in time series, i.e., when it is judged that the selected program is a program presently being broadcasted ("Yes" at step S24), the reproduction control unit 28 causes the content receiving unit 29 to receive a broadcast of the program (step S25), causes the display unit 13 to display the received program (step S26), and finishes this processing.

When it is judged at step S24 that the broadcast date and the start time of the selected program are further in the future than the present date and time, i.e., when it is judged that the selected program is a program scheduled to be broadcasted ("No" at step S24), the reproduction control unit 28 schedules recording of the program (step S27) and finishes this processing.

As described above, according to the first embodiment, a word tied to a keyword input by speech can be included in retrieval candidate words based on family attributes of respective words registered in the word dictionary. Therefore, it is possible to efficiently retrieve contents related to a name represented by the keyword and an alias of the name and improve convenience for the user.

In the word expansion processing (step S16) according to this embodiment, even when the keyword input from the word expanding unit 24 is not a formal name, i.e., when "M", which means the origin of a word, is not included in a family attribute of a word representing the keyword, the keyword is included in retrieval candidate words. However, the present invention is not limited to this.

Figure 13:
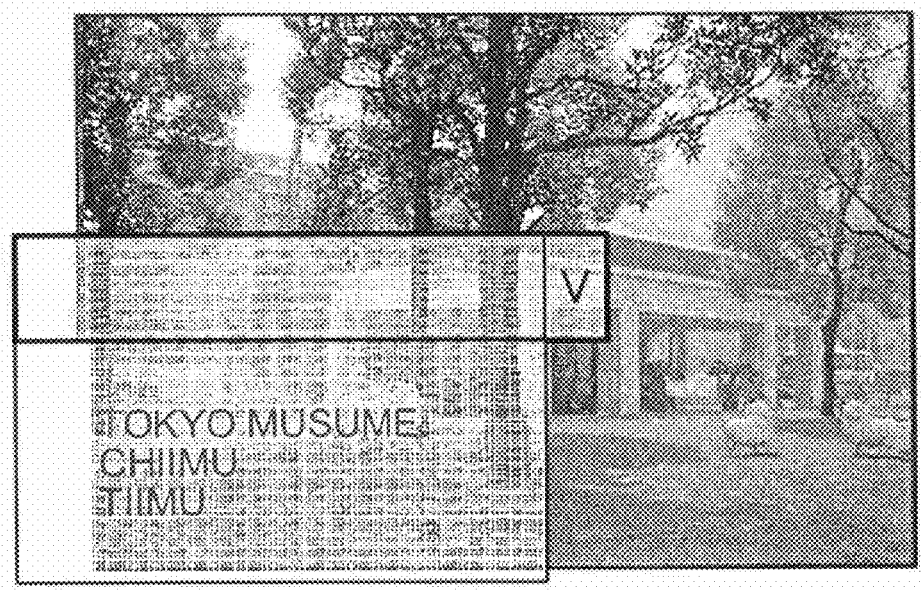
FIG. 13 is a diagram illustrating an example of the screen for display of retrieval candidate words.

For example, when the keyword is an alias, the keyword does not have to be included in retrieval candidate words. This can be realized by storing, at step S167 of the word expansion processing explained referring to FIG. 10, only family words including "M", which means the origin of a word, in family attributes thereof as retrieval candidate words from the retrieval result information stored at step S166. When such a form is adopted, the retrieval candidate words displayed on the display unit 13 are represented as shown in FIG. 13. FIG. 13 is a diagram corresponding to FIG. 11B. An example of display performed when a speech signal "tiimusu" is input. As shown in the figure, regardless of the fact that the speech signal "tiimusu" is input, "T Musu." corresponding to the speech signal is not displayed and only the formal name "Tokyo Musume." of "T Musu." is displayed.

In this embodiment, content related to any one of words included in expanded retrieval words is retrieved from the content-information storing unit 1711 and the content-material storing unit 1712. However, the present invention is not limited to this. For example, relevant content can be retrieved from only one of the content-information storing unit 1711 and the content-material storing unit 1712.

A retrieving apparatus according to a second embodiment of the present invention is explained. Components same as those in the first embodiment are denoted by the same reference numerals and signs and explanation of the components is omitted.

In the first embodiment, contents stored in the content-information storing unit 1711 are electronic program guide (EPG) data. Therefore, the contents are updated as time elapses. Contents stored in the content-material storing unit 1712 are contents recorded by the user. Therefore, new content is stored every time recording is performed.

Because the contents change as time elapses as described above, words registered in the word dictionary 172 also need to follow the change in the content-information storing unit 1711 and the content-material storing unit 1712. However, in the first embodiment, because the word dictionary 172 is a fixed dictionary stored in advance, it is likely that the word dictionary 172 cannot follow such a change and store new words.

A retrieving apparatus 2 according to the second embodiment can follow the change with time of contents described above.

Figure 14:
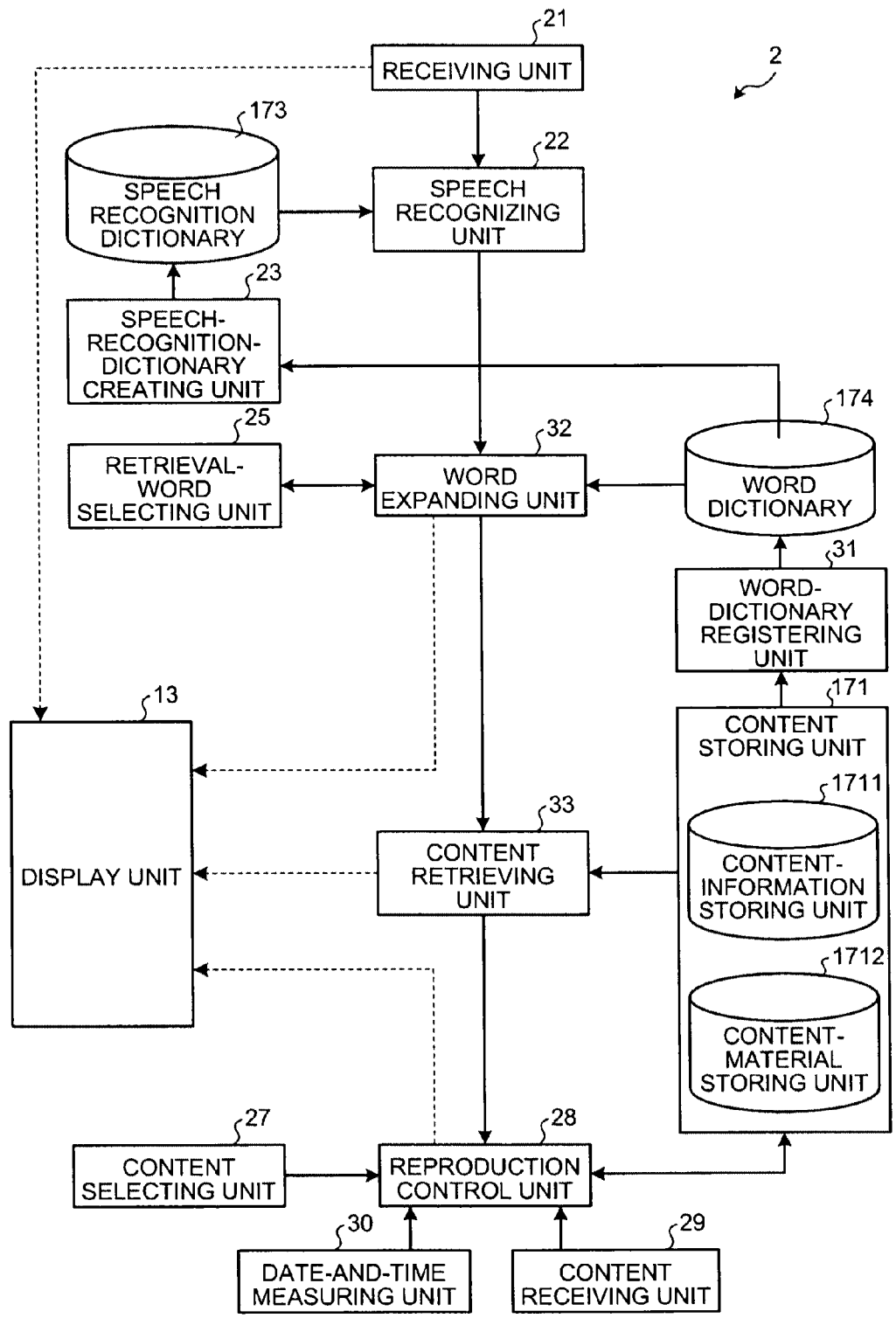
FIG. 14 is a diagram illustrating the functional structure of a retrieving apparatus according to a second embodiment of the present invention.

Referring to FIG. 14, respective functional units of the retrieving apparatus 2 realized by cooperation of the CPU 11 and the programs stored in the ROM 14 or the storing unit 17 are explained. FIG. 14 is a block diagram illustrating the functional structure of the retrieving apparatus 2 according to the second embodiment.

As shown in FIG. 14, the retrieving apparatus 2 includes a word-dictionary registering unit 31, a word expanding unit 32, and a content retrieving unit 33 in addition to the receiving unit 21, the speech recognizing unit 22, the speech-recognition-dictionary creating unit 23, the retrieval-word selecting unit 25, the content selecting unit 27, the reproduction control unit 28, the content receiving unit 29, and the date-and-time measuring unit 30 described above. The storing unit 17 stores a word dictionary 174 instead of the word dictionary 172.

The word-dictionary registering unit 31 extracts a word by applying morphological analysis to respective character strings included in the electronic program guide data of the content-information storing unit 1711 and the additional information of the content-material storing unit 1712 and registers the extracted word in the word dictionary 174.

The morphological analysis is a technology for dividing a character string into morphemes (minimum units having meanings in a language). In the morphological analysis, graph structure called lattice in which morpheme candidates are listed is formed based on a dictionary that includes a word list having information such as "part of speech", information defining conjugated forms of words of the word list, and information concerning readings of the words (all of which are not shown in the figure). A word most likely to be a candidate is extracted from the graph structure according to rules or statistical processing. It is possible to use a publicly-known technology for the morphological analysis.

In registering the extracted word in the word dictionary 174, the word-dictionary registering unit 31 registers, in association with the extracted word, a presence attribute indicating in which of the content-information storing unit 1711 and the content-material storing unit 1712 the extracted word is stored.

FIG. 15 is a diagram illustrating an example of the word dictionary 174 stored in the storing unit 17. As shown in the figure, for each of headings of respective words, "reading", "family attribute", "classification attribute", and "presence attribute" are registered in association with one another.

The word dictionary 174 is different from the word dictionary 172 shown in FIG. 6 only in the presence attribute on the last row. The presence attribute indicates storage locations of the respective words. Specifically, the presence attribute indicates whether the word indicated by the heading is present in the content storing unit 171 and, when the word is present, in which of the content-information storing unit 1711 and the content-material storing unit 1712 the word is present.

For example, in the case of "Tokyo Musume.", "c202" is registered as the presence attribute. "c" of "c202" indicates that the word is recorded in the content-material storing unit 1712. In the case of "Sugita Kaoru", "e3802" is registered as the presence attribute. "e" of "e3802" indicates that the word is stored in the content-information storing unit 1711. A character string (e.g., 3802) following "c" or "e" means an address (a storage address) of a header of content in which the word is present.

On the other hand, in the case of "T Musu.", the presence attribute is "NA". This means that the word "T Musu." is not present in both the content-information storing unit 1711 and the content-material storing unit 1712.

Referring back to FIG. 14, the word expanding unit 32 retrieves, based on a character string of a keyword input from the wound recognizing unit 22, a word coinciding with the keyword from the word dictionary 174. The word expanding unit 32 also retrieves, based on a family attribute associated with the word, another word (a family word) tied to the word from the word dictionary 174. The word expanding unit 32 causes the display unit 13 to display the retrieved words (the keywords and the family words) as retrieval candidate words. The word expanding unit 32 outputs a retrieval word input from the retrieval-word selecting unit 25 and a family word tied to the retrieval word to the content retrieving unit 33 as expanded retrieval words together with presence attributes associated with the respective words.

The content retrieving unit 33 retrieves, based on presence attributes associated with respective words included in the expanded retrieval words input from the word expanding unit 32, content including a character string of any one of the words from the content-information storing unit 1711 and the content-material storing unit 1712.

Specifically, the content retrieving unit 33 retrieves a word indicated as being stored in the content-information storing unit 1711 by the presence attribute from the content-information storing unit 1711. The content retrieving unit 33 retrieves a word indicated as being stored in the content-material storing unit 1712 by the presence attribute from the content-material storing unit 1712. A word, the presence attribute of which is "NA", is a word not present in the content-information storing unit 1711 and the content-material storing unit 1712. Therefore, retrieval for the word is not performed.

Figure 16A:
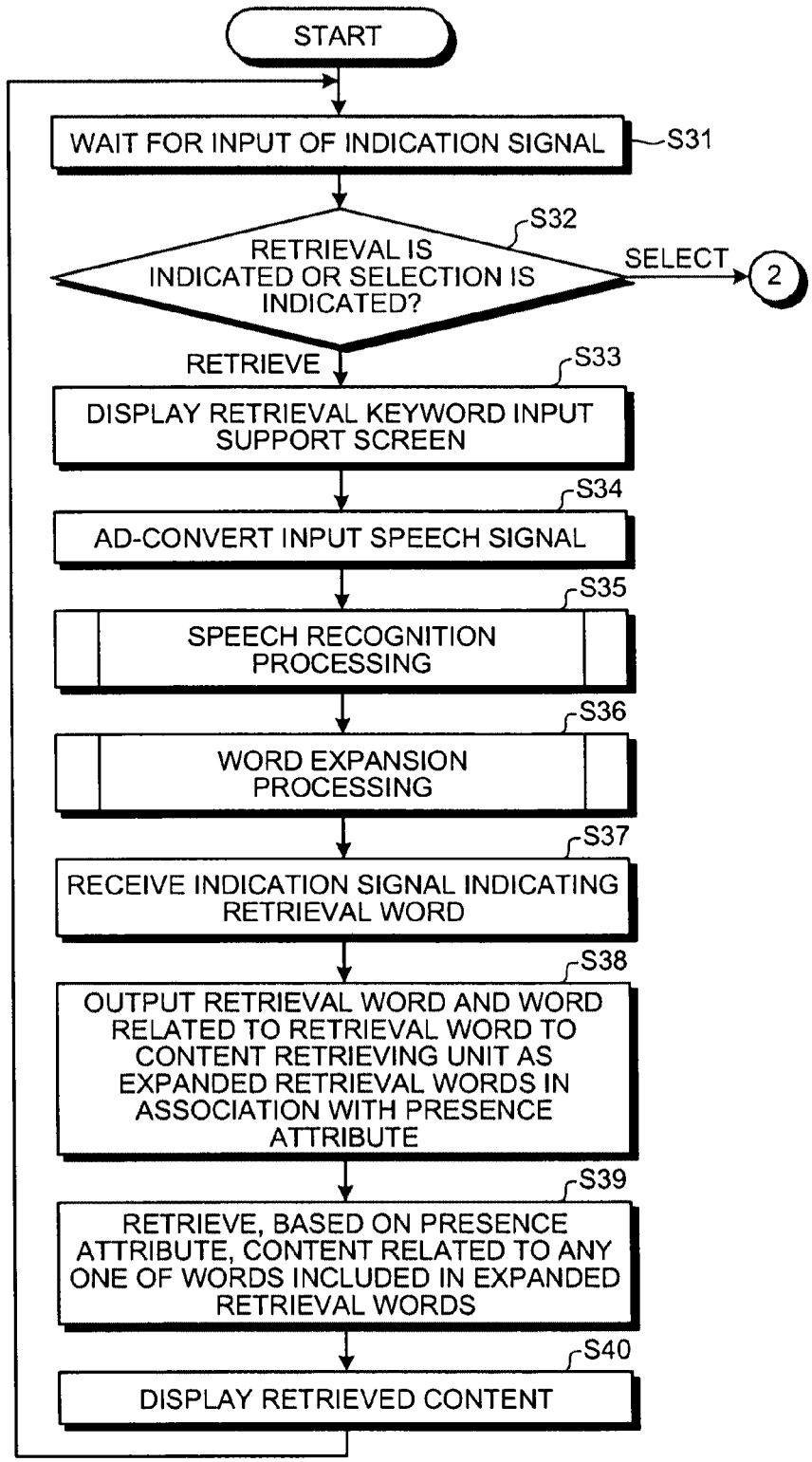
FIGS. 16A and 16B are flowcharts of a procedure of content retrieval and reproduction processing according to the second embodiment.
Figure 16B:
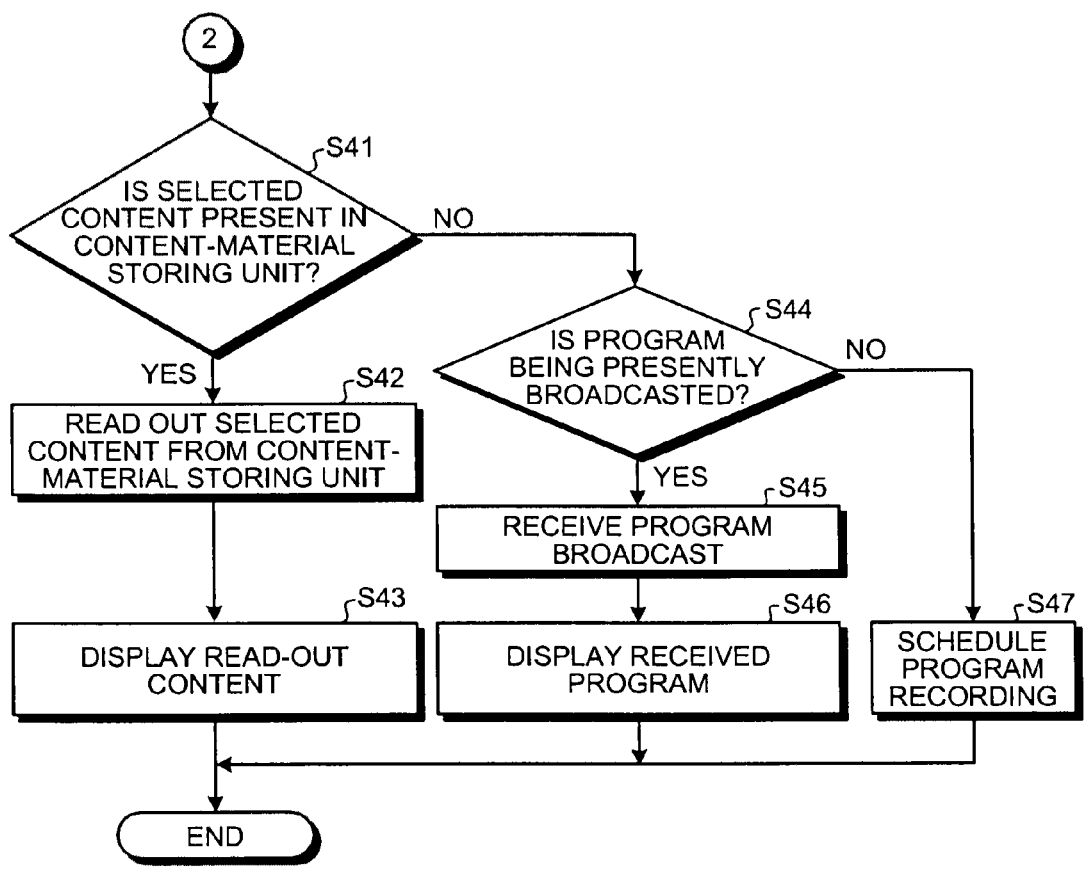

FIGS. 16A and 16B are flowcharts of a procedure of content retrieval and reproduction processing by the retrieving apparatus 2.

First, the receiving unit 21 is on standby until an indication signal is input from the input unit 12 (step S31). In this state, when it is judged that an indication signal indicating that the retrieval button 123 of the input unit 12 is depressed is received ("retrieve" at step S32), the receiving unit 21 causes the display unit 13 to display a screen for urging input of a retrieval object keyword (step S33).

When it is judged that a speech signal of speech input to the microphone 122 is received during the input of indication information indicating that the retrieval button 123 is depressed, the receiving unit 21 AD-converts the speech signal and outputs the speech signal to the speech recognizing unit 22 (step S34). The speech recognizing unit 22 executes speech recognition processing based on a digital speech signal AD-converted at step S34 (step S35). The speech recognition processing at step S35 is the same as the speech recognition processing at step S15 explained referring to FIG. 9. Therefore, explanation of the speech recognition processing is omitted.

The word expanding unit 32 executes word expansion processing based on keywords input from the speech recognizing unit 22 (step S36).

Figure 17:
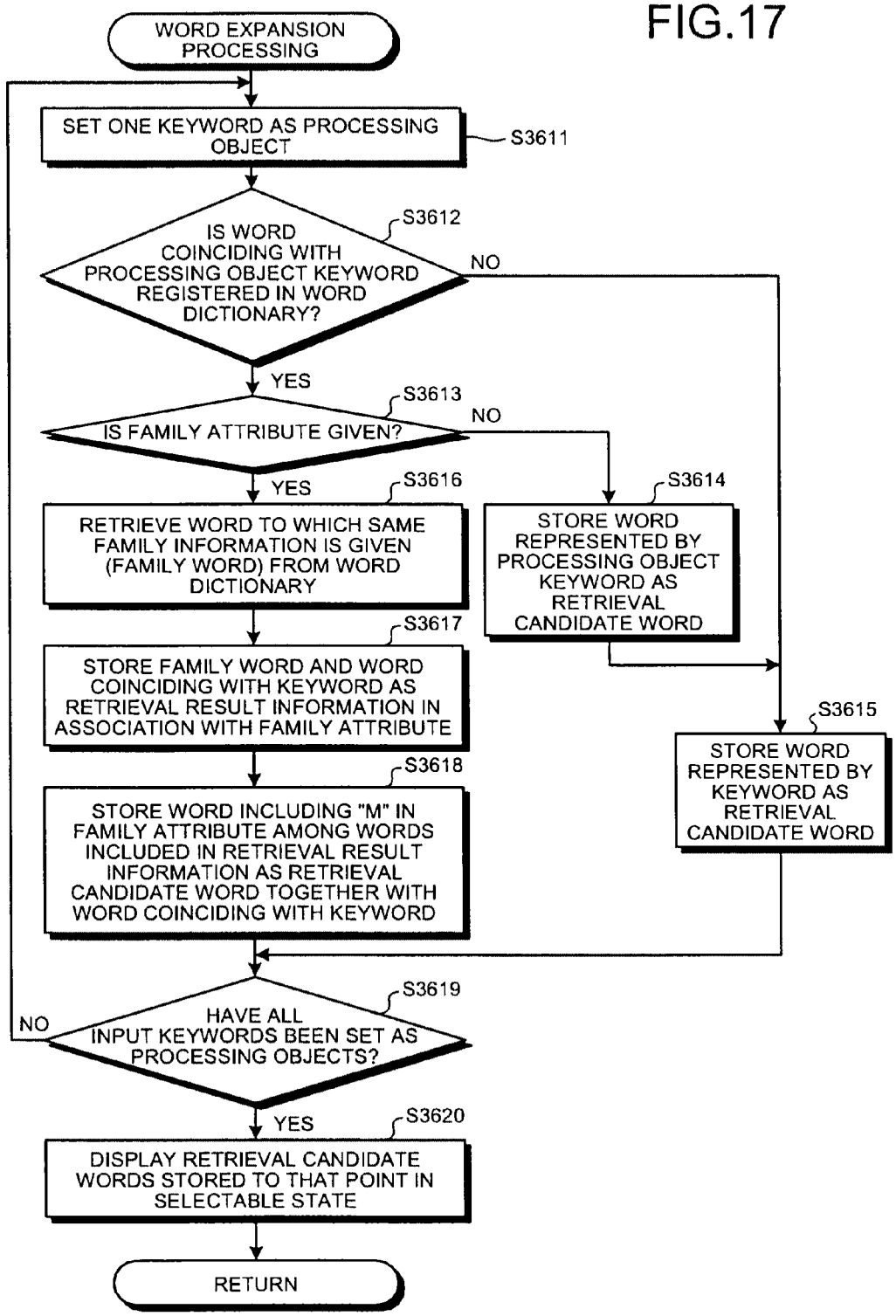
FIG. 17 is a flowchart of a procedure of word expansion processing shown in FIGS. 16A and 16B.

FIG. 17 is a flowchart of a procedure of the word expansion processing at step S26. First, the word expanding unit 32 sets one keyword among the keywords input from the speech recognizing unit 22 as a processing object (step S3611). The word expanding unit 32 retrieves a word coinciding with the keyword from the word dictionary 174 to judge whether the keyword is registered in the word dictionary 174 (step S3612). When it is judged that a word coinciding with the keyword is not registered ("No" at step S3612), the word expanding unit 32 stores a word represented by the processing object keyword as a retrieval candidate word (step S3615) and shifts to processing at step S3619.

On the other hand, when it is judged at step S3612 that a word coinciding with the keyword is registered in the word dictionary 174 ("Yes" at step S3612), the word expanding unit 32 judges whether a family attribute is given to the word (step S3613). When it is judged that a family attribute is not given to the retrieved word ("No" at step S3613), the word expanding unit 32 stores the word coinciding with the processing object keyword as retrieval result information associated with a presence attribute of the word (step S3614). Subsequently, the word expanding unit 32 stores the word represented by the processing object keyword as a retrieval candidate word (step S3615) and shifts to processing at step S3619.

When it is judged at step S3613 that a family attribute is associated with the retrieved word ("Yes" at step S3613), the word expanding unit 32 retrieves, based on the family attribute of the word, another word (a family word) having family information same as family information of the family attribute from the word dictionary 174 (step S3616). The word expanding unit 32 stores retrieval result information in which the family word retrieved at step S3616 and the word corresponding to the processing object keyword are associated with the family attributes and presence attributes of the respective words (step S3617).

When the processing object keyword is "T Musu.", "T Musu." is registered in the word dictionary 174. Therefore, the word expanding unit 32 judges whether a family attribute is given to the word.

A family attribute of "T Musu." registered in the word dictionary 174 is "f1000D". Therefore, the word expanding unit 32 retrieves, from the word dictionary 174, family words to which family information same as family information of the family attribute is given. Because the family information of "T Musu." is "f1000", words to which "f1000" is given, i.e., "Tokyo Musume." (f1000M), "Musume." (f1000D), and "TKO Musume." (f1000D) are retrieved as family words.

At step S3617, the word expanding unit 32 stores the retrieved family words and the word associated with the processing object keyword in association with the family attributes and presence attributes of the respective words. In other words, "(T Musu., f1000D, NA)", "(Tokyo Musume., f1000M, c202", "(Musume., f10000D, NA)", and "(TKO Musume., f1000D, NA)" are stored as retrieval result information. A family retrieval is not present in the retrieval result information stored at step S3614. Therefore, the retrieval result information is stored in a state such as "(Chiimu, NA, e178)".

At the following step S3618, the word expanding unit 32 stores family words including "M", which means the origin of a word, in the retrieval result information stored at step S166 as retrieval candidate words together with the word corresponding to the processing object keyword (step S3618) and shifts to processing at step S3619. When the processing object keyword coincides with a family words including "M", i.e., when the processing object keyword represents a formal name of a specific object, the word expanding unit 32 stores only the word corresponding to the keyword as a retrieval candidate word.

At the following step S3619, the word expanding unit 32 judges whether all keywords input from the speech recognizing unit 22 have been set as processing objects. When it is judged that an unprocessed keyword is present ("No" at step S3619), the word expanding unit 32 shifts to step S3611 and sets the unprocessed keyword as a processing object.

On the other hand, when it is judged at step S3619 that all the keywords have been set as processing objects ("Yes" at step S3619), the word expanding unit 32 causes the display unit 13 to display a group of words stored as retrieval candidate words to that point (step S3620) and shifts to processing at step S37.

Referring back to FIGS. 16A and 16B, the retrieval-word selecting unit 25 receives designation information designating a retrieval word out of the retrieval candidate words from the input unit 12 and outputs the retrieval word to the word expanding unit 32 (step S37).

When the retrieval word is input from the retrieval-word selecting unit 25, the word expanding unit 32 specifies, from the retrieval result information, a family word to which family information same as family information of the retrieval word is given and outputs the retrieval word and the family word of the retrieval word to the content retrieving unit 33 as expanded retrieval words (step S38). In this embodiment, the retrieval result information stored at step S3617 of step S36 is used. However, a family word tied to a retrieval word can be retrieved from the word dictionary 174 again.

The content retrieving unit 33 retrieves based on the expanded retrieval words input from the word expanding unit 32 and based on the presence attribute, contents including any one of words included in the expanded retrieval words from the content-information storing unit 1711 and the content-material storing unit 1712 (step S39).

For example, "(T Musu., NA)", "(Tokyo Musume., c202)", "(Musume., NA)", and "(TKO Musume., NA)" are input from the word expanding unit 32 as expanded retrieval words. The content retrieving unit 33 performs retrieval only for a word, presence information of which is other than "NA", i.e., "(Tokyo Musume., c202)". The content retrieving unit 33 retrieves, based on the presence attribute "c202" of "(Tokyo Musume., c202)", this word from the content-material storing unit 1712.

When a word with which a presence attribute is not associated is input from the word expanding unit 32 as an expanded retrieval word, the word is considered to be a word to which presence information is not given, i.e., a word before registration in the word dictionary 174. Therefore, the content retrieving unit 33 retrieves content including a character string coinciding with the word, with which a presence attribute is not associated, from the content-information storing unit 1711 and the content-material storing unit 1712.

The content retrieving unit 33 causes the display unit 13 to display the respective contents retrieved at step S39 in a selectable state (step S40) and returns to the processing at step S31. When relevant content is not retrieved in the retrieval processing at step S39, information indicating to that effect is displayed on the display unit 13.

At step S31, an indication signal for selecting processing object content from a list of the contents displayed at step S40 is received by the content selecting unit 27 ("select" at step S32). The reproduction control unit 28 judges whether the selected content is stored in the content-material storing unit 1712 (step S41). The judgment on a storage location of the content can be performed based on a presence attribute.

When it is judged at step S41 that the selected content is stored in the content-material storing unit 1712 ("Yes" at step S41), the reproduction control unit 28 reads out relevant content from the content-material storing unit 1712 (step S42). Subsequently, the reproduction control unit 28 reproduces the read-out content to cause the display unit 13 to display the content (step S43) and finishes this processing.

On the other hand, when it is judged at step S41 that the selected content is stored in the content-information storing unit 1711, i.e., when it is judged that the selected content is a program described in the electronic program guide data ("No" at step S41), the reproduction control unit 28 compares a broadcast date, start time, and end time of the program and the present date and time (step S44).

When it is judged that the broadcast date, the start time, and the end time of the selected program and the present date and time overlap in time series, i.e., when it is judged that the selected program is a program presently being broadcasted ("Yes" at step S44), the reproduction control unit 28 causes the content receiving unit 29 to receive a broadcast of the program (step S45), causes the display unit 13 to display the received program (step S46), and finishes this processing.

When it is judged at step S44 that the broadcast date and the start time of the selected program are further in the future than the present date and time, i.e., when it is judged that the selected program is a program scheduled to be broadcasted ("No" at step S44), the reproduction control unit 28 schedules recording of the program (step S47) and finishes this processing.

As described above, according to this embodiment, a word tied to a keyword input by speech can be included in retrieval candidate words based on family attributes of respective words registered in the word dictionary. Therefore, it is possible to efficiently retrieve contents related to a name represented by the keyword and an alias of the name and improve convenience for the user.

According to this embodiment, presence attributes of respective words included in respective contents are registered in the word dictionary and contents are retrieved based on the presence attributes. Therefore, it is possible to more efficiently retrieve contents related to a name represented by the keyword and an alias of the name.

In this embodiment, as shown in FIG. 15, an address of a header of content in which a word is present is included in the presence attribute. However, the present invention is not limited to this.

For example, only information indicating in which of the content-information storing unit 1711 and the content-material storing unit 1712 the word is present can be included in the presence attribute. Specifically, when the word is present in the content-information storing unit 1711, "e" can be included in the presence attribute, when the word is present in the content-material storing unit 1712, "c" can be included in the presence attribute, and, when the word is not present in both the content-information storing unit 1711 and the content-material storing unit 1712, "NA" can be included in the presence attribute.

In FIG. 15, only one piece of presence information is associated with each of the headings. However, the present invention is not limited to this. For example, a certain word can be present in both the content-information storing unit 1711 and the content-material storing unit 1712. In such a case, two pieces of presence information can be registered.

A retrieving apparatus according to a third embodiment of the present invention is explained. Components same as those in the first and second embodiments are denoted by the same reference numerals and signs and explanation of the components are omitted.

In the second embodiment, a word to be registered in the word dictionary 174 is extracted from character strings included in the content-information storing unit 1711 and the content-material storing unit 1712 by the word-dictionary registering unit 31. In this form, it is possible to register the extracted word in the word dictionary 174. However, there is room for improvement concerning the judgment on whether the extracted word is in a familiar relation with other words.

For example, words such as "Tokyo Daigaku", which is abbreviated as "Todai", "United States of America", which is abbreviated as "Bei", "Inter Collage", which is abbreviated as "Inkare", and "Computer Graphics", which is abbreviated as "CG", can be included in the dictionary used for morphological analysis as abbreviated words. However, to catch up with aliases that change following the current of the times such as "T Musu.", "Musume.", "TKO Musume.", which are abbreviations of "Tokyo Musume.", the user needs to set a familiar relation among the respective words.

Therefore, in the third embodiment, a retrieving apparatus 3 that can improve setting of the familiar relation among the words is explained.

Figure 18:
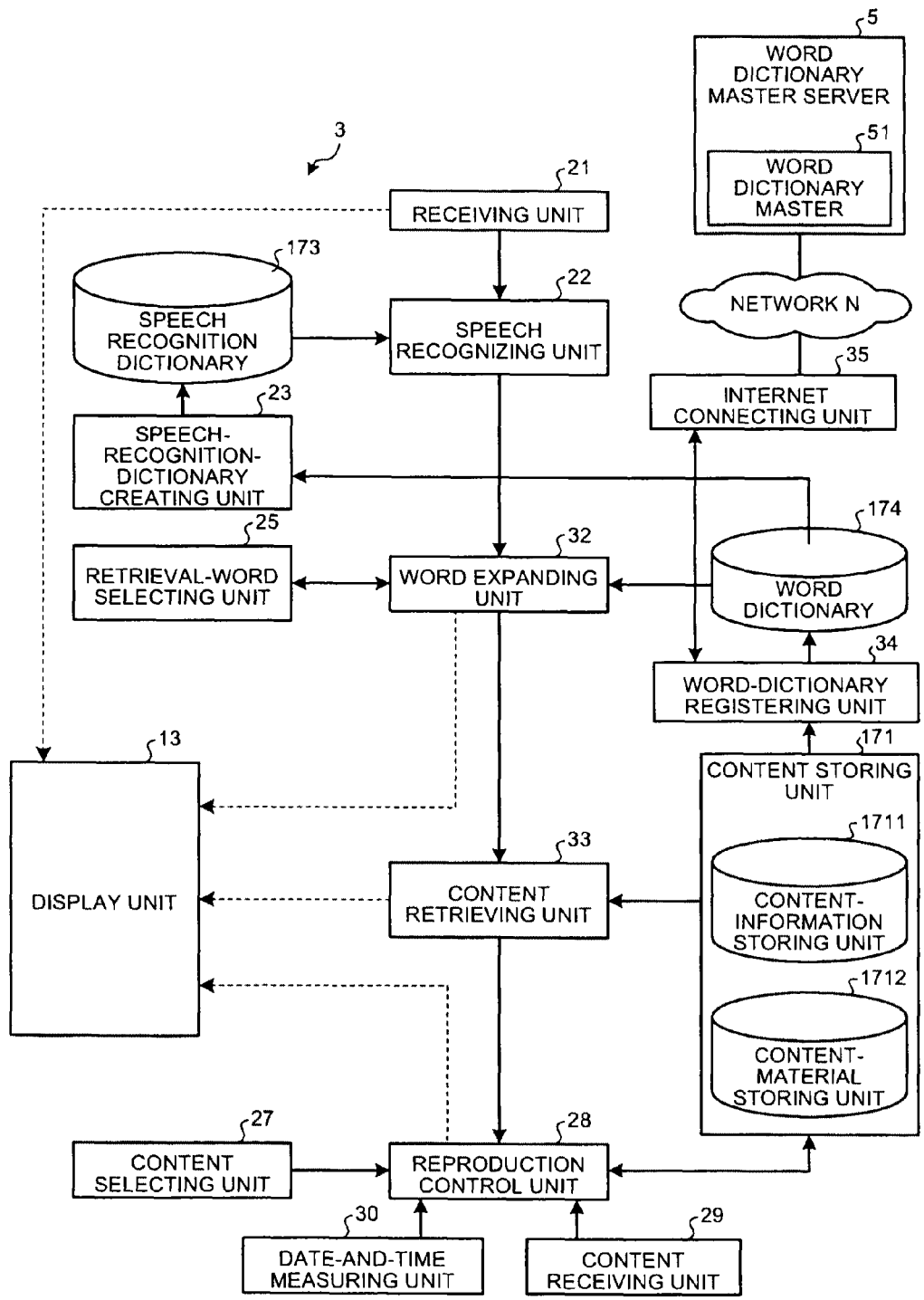
FIG. 18 is a diagram illustrating the functional structure of a retrieving apparatus according to a third embodiment of the present invention.

Referring to FIG. 18, respective functional units of the retrieving apparatus 3 realized by cooperation of the CPU 11 and the programs stored in the ROM 14 or the storing unit 17 are explained. FIG. 18 is a block diagram illustrating the functional structure of the retrieving apparatus 3 according to the third embodiment.

As shown in FIG. 18, the retrieving apparatus 3 includes a word-dictionary registering unit 34 and an Internet connecting unit 35 in addition to the receiving unit 21, the speech recognizing unit 22, the speech-recognition-dictionary creating unit 23, the retrieval-word selecting unit 25, the content selecting unit 27, the reproduction control unit 28, the content receiving unit 29, the date-and-time measuring unit 30, the word expanding unit 32, and the content retrieving unit 33 described above. The retrieving apparatus 3 and a word dictionary master server 5 are connected to be capable of communicating with each other through a network N such as the Internet.

The word dictionary master server 5 is a Web server, an ftp server, or the like capable of providing an external apparatus with information and is an information resource present on the network N. Specifically, the word dictionary master server 5 provides, in response to a request from the retrieving apparatus 3, the external apparatus (the retrieving apparatus 3) with a word dictionary master 51 stored in the word dictionary master server 5 itself. The word dictionary master 51 is a word dictionary that is a master of the word dictionary 174. In the word dictionary 174, a relation between respective words and aliases of the words is updated at a predetermined time interval (e.g., every few hours) manually by others or automatically by using a Backus-Naur form described later.

FIG. 19 is a diagram illustrating an example of the word dictionary master 51. As shown in FIG. 19, in the word dictionary master 51, for each of headings of respective words, "reading", "family attribute", "classification attribute", and "presence attribute" are stored in association with one another. Explanation of the respective items is the same as the above explanation. In the example shown in FIG. 19, "presence attribute" is associated with the respective headings. However, "presence attribute" may be omitted. When "presence attribute" is associated with the headings, it is preferable to give "NA" to "presence attribute" because a storage location of content is different for each of retrieving apparatuses.

Referring back to FIG. 18, the word-dictionary registering unit 34 has functions same as those of the word-dictionary registering unit 31. The word-dictionary registering unit 34 acquires the word dictionary master 51 from the word dictionary master server 5 via the Internet connecting unit 35 and compares the word dictionary master 51 and the word dictionary 174 to update the content of the word dictionary 174.

Specifically, the word-dictionary registering unit 34 merges the respective items "heading", "reading", "family attribute", "classification attribute", and "presence attribute" of the word dictionary master 51 with the word dictionary 174 to update the content of the word dictionary 174. Concerning "presence attribute", the registered content of the word dictionary 174 is given priority.

For example, the word dictionary 174 is in a state shown in FIG. 20. The word-dictionary registering unit 34 compares the word dictionary master 51 shown in FIG. 19 and the word dictionary 174 shown in FIG. 20 and adds a difference between the word dictionary master 51 and the word dictionary 174 to the word dictionary 174 or changes the word dictionary 174 to update the word dictionary 174 to a state shown in FIG. 21.

When words are extracted from the content-information storing unit 1711 and the content-material storing unit 1712 by the morphological analysis, the word-dictionary registering unit 34 registers a character string representing a location of presence of a word coinciding with a word, "presence attribute" of which is "NA" in the word dictionary 174, in "presence attribute".

The internet connecting unit 35 acquires, through the communication unit 16, information from an external apparatus connected to the network N. Specifically, the Internet connecting unit 35 acquires, according to an instruction from the word-dictionary registering unit 34, the word dictionary master 51 from the word dictionary master server 5 connected to the network N.

As described above, according to this embodiment, a word tied to a keyword input by speech can be included in retrieval candidate words based on family attributes of respective words registered in the word dictionary. Therefore, it is possible to efficiently retrieve contents related to a name represented by the keyword and an alias of the name and improve convenience for the user.

According to this embodiment, the word dictionary 174 can be updated based on the word dictionary master 51 acquired from the word dictionary master server 5. Therefore, it is possible to follow a change in a word, a pronunciation and a name of which change according to the current of the times.

Timing when the word-dictionary registering unit 34 acquires the word dictionary master 51 from the word dictionary master server 5 can be any timing. However, it is preferable to acquire the word dictionary mater 51 at every predetermined time interval such as once a day.

A retrieving apparatus according to a fourth embodiment of the present invention is explained. Components same as those in the first, second, and third embodiments are denoted by the same reference numerals and signs and explanation of the component is omitted.

In the third embodiment, the word dictionary 174 is updated with the word dictionary master 51 provided by the word dictionary master server 5. In the retrieving apparatus 4 according to the fourth embodiment, the retrieving apparatus 4 itself judges a familiar relation among words included in content stored in the content storing unit 171 and updates the word dictionary 174 based on a result of the judgment.

Figure 22:
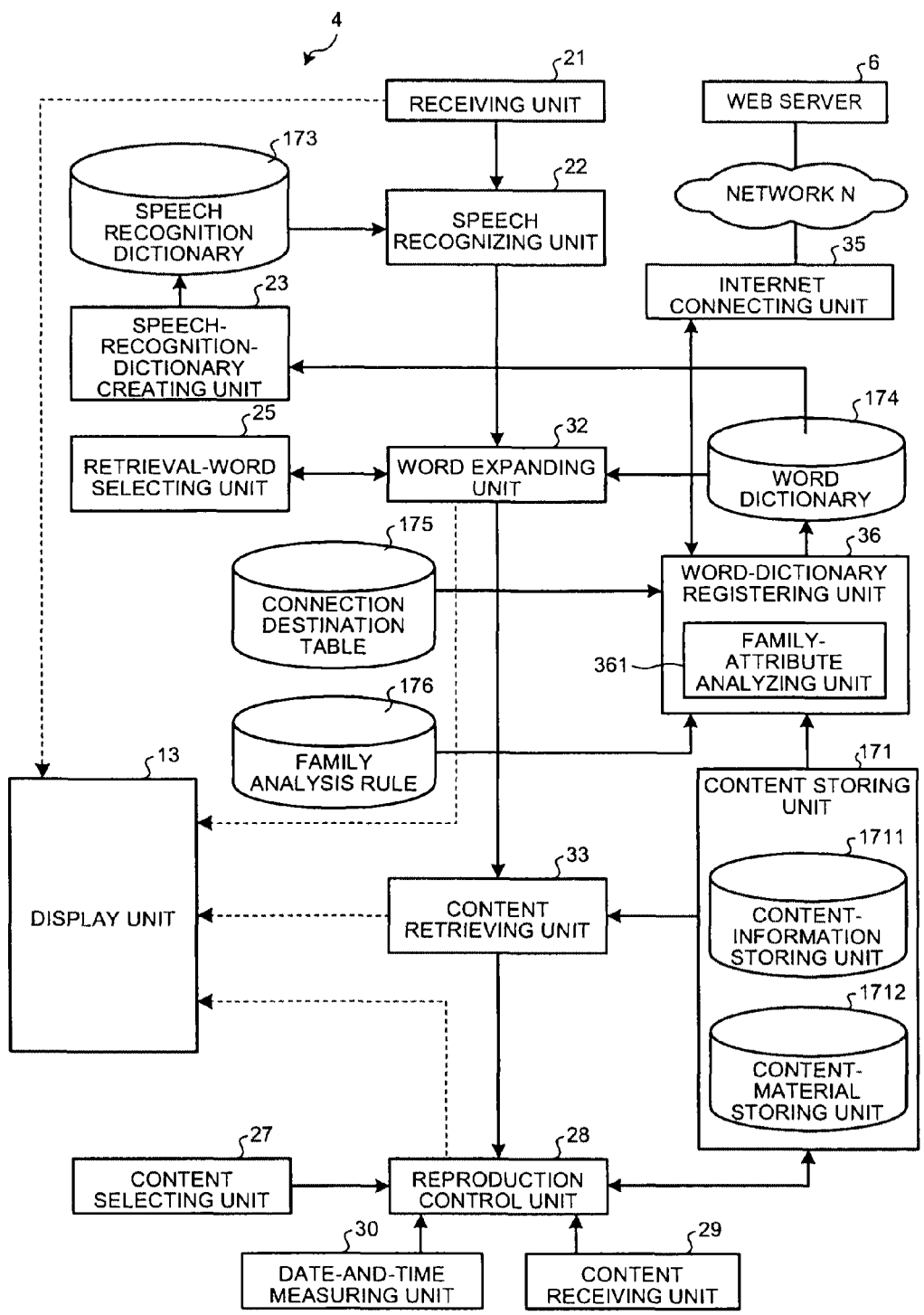
FIG. 22 is a diagram illustrating the functional structure of a retrieving apparatus according to a fourth embodiment of the present invention.

Referring to FIG. 22, respective functional units of the retrieving apparatus 4 realized by cooperation of the CPU 11 and the programs stored in the ROM 14 or the storing unit 17 are explained. FIG. 22 is a block diagram illustrating the functional structure of the retrieving apparatus 4 according to the fourth embodiment.

As shown in FIG. 22, the retrieving apparatus 4 includes a word-dictionary registering unit 36 in addition to the receiving unit 21, the speech recognizing unit 22, the speech-recognition-dictionary creating unit 23, the retrieval-word selecting unit 25, the content selecting unit 27, the reproduction control unit 28, the content receiving unit 29, the date-and-time measuring unit 30, the word expanding unit 32, the content retrieving unit 33, and the Internet connecting unit 35 described above. The storing unit 17 stores a connection destination table 175 and a family analysis rule 176 described later. The retrieving apparatus 4 and a Web server 6 are connected to be capable of communicating with each other through the network N such as the Internet.

The Web server 6 is a Web server that can provide an external apparatus with information and is an information resource present on the network N. Specifically, the Web server 6 provides, in response to a request from the retrieving apparatus 4, the external apparatus (the retrieving apparatus 4) with a Web page (not shown) such as an HTML file stored in the Web server 6 itself or dynamically created. The number of Web servers 6 connected to the network N is not specifically limited.

The word-dictionary registering unit 36 has functions same as those of the word-dictionary registering unit 31. The word-dictionary registering unit 36 acquires, based on a word extracted by analyzing character strings included in the content-information storing unit 1711 and the content-material storing unit 1712, a Web page related to the word from the Web server 6 through the Internet connecting unit 35.

Among Web sites, there is a site called consumer generated media (CGN) for a large number of users to share knowledge. In such a Web site, in general, knowledge specialized for a service field is often shared. Therefore, it is possible to improve accuracy of retrieval by setting in advance a Web site (a uniform resource locator (URL) of the Web server 6) as a connection destination for each of fields of words to be retrieved.

FIG. 23 is a diagram illustrating an example of the connection destination table 175 in which a URL of the Web server 6 as a connection destination is set according to a field of a retrieval object word. In the figure, "classification attribute" corresponds to "classification attribute" included in the word dictionary 174. For each of fields, URLs of the Web server 6 as three connection destinations for first retrieval to third retrieval are registered. By storing such a connection destination table 175 in the storing unit 17 in advance, it is possible to properly use the Web server 6 as a connection destination for each of fields of words to be retrieved.

When the connection destination table 175 is used, the word-dictionary registering unit 36 refers to, in the connection destination table 175, a URL corresponding to "classification attribute" of a word registered in the word dictionary 174 and makes connection to the Web server 6 having the URL to perform retrieval of a Web page related to the word. For example, concerning "Tokyo Musume.", it is possible to obtain retrieval results (Web pages) shown in FIGS. 24A and 24B. Concerning an abbreviated word such as "DNA", it is possible to obtain a retrieval result shown in FIG. 24C.

It is preferable that retrieval by the word-dictionary registering unit 36 is performed only for words, "family attribute" of which is "NA". When the Web server 6 as a connection destination is a retrieval site, the word-dictionary registering unit 36 transmits a retrieval object word (e.g., Tokyo Musume.) as a retrieval key.

The word-dictionary registering unit 36 has a family-attribute analyzing unit 361. The family-attribute analyzing unit 361 analyzes a retrieval result (a Web page) obtained from the Web server 6 using, for example, the family analysis rule 176 shown in FIG. 25 and extracts a word tied to the retrieval object word and a reading of the word.

The family analysis rule 176 shown in FIG. 25 is called a Backus-Naur form (BNF) and is written according to a normal notation for describing syntax. Because an actual Web page is described in HTML, a family analysis rule also including tags of HTML should be described. However, in the family analysis rule shown in the figure, parts related to description in HTML are omitted for simplification of explanation.

In the Backus-Naur form, a character string between "<" and ">" is called a component. "::=" indicates that a component on a left side thereof is formed by a character string on a right side thereof. For example, "<alphanumeric character>" indicates that the component is formed by any one of alphabets from "a" to "z", alphabets from "A" to "Z", and numbers from "0" to "9". "|" indicates a meaning "or".

In FIG. 25, a component "family word row" is formed by a family indication word (an abbreviated name, a nickname, or a popular name), a particle (ga, wa, wo, mo, ni, or niwa), and a family word. Referring to an example shown in FIG. 24A, specifically, "Tokyo Musume." on a first row is a noun and is a retrieval word (Tokyo Musume.) itself. This word matches "<retrieval word><reading>" of a description "<retrieval word row>::=<retrieval word><reading>|<retrieval word><blank><reading>|<retrieval word><start parenthesis><reading><end parenthesis>|" of the rule shown in FIG. 25. Therefore, it is seen that <reading> of "Tokyo Musume." is "tokyomusume".

A second row shown in FIG. 24A matches "<family indication word><particle><character string>{family word}<particle><character string><punctuation mark>" of a description "<family word row>::=<family indication word><particle>{family word}<punctuation mark>|<family indication word><particle>{<family word><punctuation mark>}|<family indication word><particle>{family word}<particle><character string><punctuation mark>|<family indication word><particle>{<family word><punctuation mark>}<particle><character string><punctuation mark>|<family indication word><particle><character string>{family word}<particle><character string><punctuation mark>|<family indication word><particle><character string>{<family word><punctuation mark>}<particle><character string><punctuation mark>|" of the rule shown in FIG. 25.

In other words, the description is analyzed as "<family indication word>(popular name)+<particle>(wa)+<character string>(mainly)+(start parenthesis)(" "+<family word>(T Musu.)+<reading>(<start parenthesis><(( )+<reading>(tiimusu)+<end parenthesis>( ))+<end parenthesis>(")+<start parenthesis>(")+<family word>(TKO Musume.)+<end parenthesis>(")+<start parenthesis>(")+<family word> (Musume.)+<end parenthesis>(")+<particle>(ga)+<character string>(widely used)+<punctuation mark>(.)". The character strings between "(" and ")" represent respective character strings on the second row shown in FIG. 24A.

"T Musu.", "TKO Musume.", and "Musume." are extracted as family words of "Tokyo Musume.". "tiimusu" corresponding to "T Musu." is extracted as a reading of the family word.

The family-attribute analyzing unit 361 registers a family word extracted from a Web page by analysis using the family analysis rule 176 and a reading of the family word in the word dictionary 174. The family-attribute analyzing unit 361 gives the same family information to family words having a common word as the origin of a word. When a word as the origin of a word is unknown, only family information can be given without including "D" or "M" in a family attribute.

The family-attribute analyzing unit 361 can register a URL of the Web server 6 as an extraction destination of a family word as well in the word dictionary 174. FIG. 26 is a diagram illustrating an example of a word dictionary 177 in which the URL of the Web server 6 as the extraction destination of the family word is registered as well. As shown in FIG. 26, in the word dictionary 177, for each of headings of respective words, "extracted Web", "reading", "family attribute", "classification attribute", and "presence attribute" of the word are registered in association with one another. The URL of the Web server 6 as the extraction destination of the family word is registered in the item of "extracted Web". When a relevant URL is not present, "NA" meaning that a relevant URL is not present is registered.

As described above, according to the fourth embodiment, even when a keyword is input by the user as a retrieval object, a word tied to a keyword input by speech can be included in the retrieval object based on family attributes of respective words registered in the word dictionary. Therefore, it is possible to efficiently retrieve contents related to a name represented by the keyword and an alias of the name and improve convenience for the user.

According to this embodiment, the retrieving apparatus 4 itself can specify a familiar relation among words included in content stored in the content storing unit 171 and update the word dictionary 174. Therefore, it is possible to follow a change in a word, a pronunciation and a name of which change according to the current of the times.

In the example explained in this embodiment, the rules shown in FIG. 25 are used as the family analysis rule. However, content of the family analysis rule is not limited to this example. For example, a description employing tags in electronic program guide data (EPG) and tags of HTML is also possible. The number of characters of a family word tends to be smaller than that of a formal name. Therefore, it is also possible to define limitation concerning the number of characters such as "the number of characters of a family word<the number of characters of a formal name".

Concerning a reading, the number of characters of the reading does not exceed the number of characters of a reading appended by the morphological analysis. Therefore, it is also possible to define limitation concerning the number of characters such as "the number of characters of an extracted reading<the number of characters of a reading by the morphological analysis".

The first to fourth embodiments have been explained. However, the present invention is not limited to the embodiments. Various modifications, replacements, additions, and the like are possible without departing from the spirit of the present invention.

A program executed by the retrieving apparatuses according to the embodiments is incorporated in the ROM 14, the storing unit 17, and the like in advance and provided. However, the present invention is not limited to this. The program can be recorded in computer-readable recording media such as a CD-ROM, a flexible disk (FD), a compact disk-recordable (CD-R), and a digital versatile disk (DVD) as a file of an installable format or an executable format and provided. The program can be stored on a computer connected to a network such as the Internet and downloaded through the network to be provided or can be provided or distributed through the network such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A retrieving apparatus comprising:
a plurality of first storing units including a content-information storing unit that stores therein electronic program guide data concerning a broadcasted content and a content-material storing unit that stores therein additional information including a recorded content and at least a part of the electronic program guide data for the recorded content;
a second storing unit that stores a word dictionary in which a plurality of registered words, a reading of each of the registered words, a family attribute representing a relation between a formal name and an alias of the formal name among the registered words, and a presence attribute representing from which of the content-information storing unit and the content-material storing unit each of the registered words is extracted are associated;
an external communication unit that acquires related information including a plurality of words, a reading of each of the words, and a family attribute representing a relation between formal name and an alias of the formal name among the words, from other word dictionary in which a relation between each word and the alias of the each word is updated at a predetermined time interval;
an extracting unit that extracts a word that is in a family relation with a registered word in the word dictionary and a reading of the word, from the related information;
a registering unit that registers, in the word dictionary, the word extracted from the electronic program guide data and the additional information, in association with the presence attribute, and that registers the word and the reading of the word extracted by the extracting unit in the word dictionary in association with a family attribute representing the family relation with the registered word;
a speech input unit that receives an input of a speech signal;
a speech recognizing unit that recognizes a character string corresponding to the speech signal as a keyword;
a retrieval-candidate expanding unit that retrieves a word coinciding with the keyword and a word familiar with the word from the word dictionary as a retrieval candidate word;
a retrieval-word selecting unit that receives a selection designation that designates any of words included in the retrieval candidate words as a retrieval word;
a retrieval-word expanding unit that sets the retrieval word and a word familiar with the retrieval word as expanded retrieval words, based on the word dictionary; and
a retrieving unit that retrieves a content related to any of words included in the expanded retrieval words one of the content-information storing unit and the content-material storing unit represented by the presence attribute associated with the word.

2. A retrieving apparatus comprising:
a plurality of first storing units including a content-information storing unit that stores therein electronic program guide data concerning a broadcasted content and a content-material storing unit that stores therein additional information including a recorded content and at least a part of the electronic program guide data for the recorded content;
a second storing unit that stores a word dictionary in which a plurality of registered words, a reading of each of the registered words, a family attribute representing a relation between a formal name and an alias of the formal name among the registered words, and a presence attribute representing from which of the content-information storing unit and the content-material storing unit each of the registered words is extracted are associated;
an external communication unit that acquires a web page on a network; and
an extracting unit that extracts a word that is in a family relation with a registered word in the word dictionary and a reading of the word from a character string included in the web page;
a registering unit that registers, in the word dictionary, the word extracted from the electronic program guide data and the additional information, in association with the presence attribute, and that registers the word and the reading of the word extracted by the extracting unit in the word dictionary in association with a family attribute representing the family relation with the registered word;

a speech input unit that receives an input of a speech signal;

a speech recognizing unit that recognizes a character string corresponding to the speech signal as a keyword;

a retrieval-candidate expanding unit that retrieves a word coinciding with the keyword and a word familiar with the word from the word dictionary as a retrieval candidate word;

a retrieval-word selecting unit that receives a selection designation that designates any of words included in the retrieval candidate words as a retrieval word;

a retrieval-word expanding unit that sets the retrieval word and a word familiar with the retrieval word as expanded retrieval words, based on the word dictionary; and a retrieving unit that retrieves a content related to any of words included in the expanded retrieval words from one of the content-information storing unit and the content-material storing unit represented by the presence attribute associated with the word.

3. The apparatus according to claim 2, further comprising:

a third storing unit that stores a connection destination table in which a field of an object represented by each of the words and a presence location of the web pages corresponding to the fields are associated with each other, wherein the external communication unit acquires the related information from the presence location of the web pages corresponding to the field of the object represented by the registered word, based on the connection destination table.

* * * * *